United States Patent
Lang

(10) Patent No.: US 10,475,449 B2
(45) Date of Patent: Nov. 12, 2019

(54) WAKE-WORD DETECTION SUPPRESSION

(71) Applicant: Sonos, Inc., Santa Barbara, CA (US)

(72) Inventor: Jonathan P. Lang, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 15/670,361

(22) Filed: Aug. 7, 2017

(65) Prior Publication Data
US 2019/0043492 A1    Feb. 7, 2019

(51) Int. Cl.
| | |
|---|---|
| *G10L 15/22* | (2006.01) |
| *G06F 3/16* | (2006.01) |
| *H04N 21/422* | (2011.01) |

(52) U.S. Cl.
CPC .............. *G10L 15/22* (2013.01); *G06F 3/165* (2013.01); *G06F 3/167* (2013.01); *H04N 21/42203* (2013.01); *G10L 2015/223* (2013.01)

(58) Field of Classification Search
CPC .... G10L 2015/088; G10L 15/28; G10L 25/84
See application file for complete search history.

(56) References Cited

U.S. PATENT DOCUMENTS

| | | | |
|---|---|---|---|
| 4,741,038 A | 4/1988 | Elko et al. | |
| 4,941,187 A | 7/1990 | Slater | |
| 5,440,644 A | 8/1995 | Farinelli et al. | |
| 5,740,260 A | 4/1998 | Odom | |
| 5,761,320 A | 6/1998 | Farinelli et al. | |
| 5,923,902 A | 7/1999 | Inagaki | |
| 6,032,202 A | 2/2000 | Lea et al. | |
| 6,256,554 B1 | 7/2001 | Dilorenzo | |
| 6,301,603 B1 | 10/2001 | Maher et al. | |
| 6,311,157 B1 | 10/2001 | Strong | |
| 6,404,811 B1 | 6/2002 | Cvetko et al. | |

(Continued)

FOREIGN PATENT DOCUMENTS

| | | |
|---|---|---|
| AU | 2017100486 A4 | 6/2017 |
| AU | 2017100581 A4 | 6/2017 |

(Continued)

OTHER PUBLICATIONS

US 9,299,346 B1, 03/2016, Hart et al. (withdrawn)

(Continued)

*Primary Examiner* — Brian L Albertalli
(74) *Attorney, Agent, or Firm* — McDonnell Boehnen Hulbert & Berghoff LLP

(57) ABSTRACT

Example techniques involve determining a direction of a NMD. An example implementation includes a playback device receiving data representing audio content for playback by the playback device. Before the audio content is played back by the playback device, the playback device detects, in the audio content, one or more wake words for one or more voice services. The playback device causes one or more networked microphone devices to disable its respective wake response to the detected one or more wake words during playback of the audio content by the playback device and plays back the audio content via one or more speakers. When enabled, the wake response of a given networked microphone device to a particular wake word causes the given networked microphone device to listen, via a microphone, for a voice command following the particular wake word.

20 Claims, 11 Drawing Sheets

(56) References Cited

U.S. PATENT DOCUMENTS

| | | |
|---|---|---|
| 6,469,633 B1 | 10/2002 | Wachter |
| 6,522,886 B1 | 2/2003 | Youngs et al. |
| 6,594,347 B1 | 7/2003 | Calder et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,661,107 B1 | 2/2010 | Van et al. |
| 7,702,508 B2 | 4/2010 | Bennett |
| 7,792,311 B1 | 9/2010 | Holmgren et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,041,565 B1 | 10/2011 | Bhardwaj et al. |
| 8,045,952 B2 | 10/2011 | Qureshey et al. |
| 8,073,125 B2 | 12/2011 | Zhang et al. |
| 8,103,009 B2 | 1/2012 | McCarty et al. |
| 8,234,395 B2 | 7/2012 | Millington et al. |
| 8,239,206 B1 | 8/2012 | Lebeau et al. |
| 8,255,224 B2 | 8/2012 | Singleton et al. |
| 8,290,603 B1 | 10/2012 | Lambourne |
| 8,364,481 B2 | 1/2013 | Strope et al. |
| 8,386,261 B2 | 2/2013 | Mellott et al. |
| 8,423,893 B2 | 4/2013 | Ramsay et al. |
| 8,428,758 B2 | 4/2013 | Naik et al. |
| 8,453,058 B1 | 5/2013 | Coccaro et al. |
| 8,483,853 B1 | 7/2013 | Lambourne |
| 8,484,025 B1 | 7/2013 | Moreno et al. |
| 8,831,761 B2 | 9/2014 | Kemp et al. |
| 8,831,957 B2 | 9/2014 | Taubman et al. |
| 8,938,394 B1 | 1/2015 | Faaborg et al. |
| 8,942,252 B2 | 1/2015 | Balassanian et al. |
| 8,983,383 B1 | 3/2015 | Haskin |
| 8,983,844 B1 | 3/2015 | Thomas et al. |
| 9,042,556 B2 | 5/2015 | Kallai et al. |
| 9,094,539 B1 | 7/2015 | Noble |
| 9,215,545 B2 | 12/2015 | Dublin et al. |
| 9,251,793 B2 | 2/2016 | Lebeau et al. |
| 9,253,572 B2 | 2/2016 | Beddingfield, Sr. et al. |
| 9,262,612 B2 | 2/2016 | Cheyer |
| 9,288,597 B2 | 3/2016 | Carlsson et al. |
| 9,300,266 B2 | 3/2016 | Grokop |
| 9,318,107 B1 | 4/2016 | Sharifi |
| 9,319,816 B1 | 4/2016 | Narayanan |
| 9,368,105 B1 * | 6/2016 | Freed .................... G10L 15/22 |
| 9,412,392 B2 | 8/2016 | Lindahl et al. |
| 9,426,567 B2 | 8/2016 | Lee et al. |
| 9,431,021 B1 | 8/2016 | Scalise et al. |
| 9,443,527 B1 | 9/2016 | Watanabe et al. |
| 9,472,201 B1 | 10/2016 | Sleator |
| 9,472,203 B1 | 10/2016 | Ayrapetian et al. |
| 9,484,030 B1 | 11/2016 | Meaney et al. |
| 9,489,948 B1 | 11/2016 | Chu et al. |
| 9,494,683 B1 | 11/2016 | Sadek |
| 9,509,269 B1 | 11/2016 | Rosenberg |
| 9,514,752 B2 | 12/2016 | Sharifi |
| 9,536,541 B2 | 1/2017 | Chen et al. |
| 9,548,053 B1 * | 1/2017 | Basye .................... G10L 15/22 |
| 9,548,066 B2 | 1/2017 | Jain et al. |
| 9,552,816 B2 | 1/2017 | Vanlund et al. |
| 9,560,441 B1 | 1/2017 | McDonough, Jr. et al. |
| 9,601,116 B2 | 3/2017 | Casado et al. |
| 9,615,170 B2 | 4/2017 | Kirsch et al. |
| 9,615,171 B1 | 4/2017 | O'Neill et al. |
| 9,632,748 B2 | 4/2017 | Faaborg et al. |
| 9,633,186 B2 | 4/2017 | Ingrassia, Jr. et al. |
| 9,633,368 B2 | 4/2017 | Greenzeiger et al. |
| 9,633,660 B2 | 4/2017 | Haughay et al. |
| 9,633,671 B2 | 4/2017 | Giacobello et al. |
| 9,633,674 B2 | 4/2017 | Sinha et al. |
| 9,640,179 B1 | 5/2017 | Hart et al. |
| 9,640,183 B2 | 5/2017 | Jung et al. |
| 9,641,919 B1 | 5/2017 | Poole et al. |
| 9,646,614 B2 | 5/2017 | Bellegarda et al. |
| 9,653,060 B1 | 5/2017 | Hilmes et al. |
| 9,653,075 B1 | 5/2017 | Chen et al. |
| 9,659,555 B1 | 5/2017 | Hilmes et al. |
| 9,672,821 B2 | 6/2017 | Krishnaswamy et al. |
| 9,685,171 B1 | 6/2017 | Yang |
| 9,691,378 B1 | 6/2017 | Meyers et al. |
| 9,691,379 B1 | 6/2017 | Mathias et al. |
| 9,697,826 B2 | 7/2017 | Sainath et al. |
| 9,697,828 B1 | 7/2017 | Prasad et al. |
| 9,698,999 B2 | 7/2017 | Mutagi et al. |
| 9,704,478 B1 | 7/2017 | Vitaladevuni et al. |
| 9,721,566 B2 * | 8/2017 | Newendorp ............ G10L 15/32 |
| 9,721,568 B1 | 8/2017 | Polansky et al. |
| 9,721,570 B1 | 8/2017 | Beal et al. |
| 9,728,188 B1 | 8/2017 | Rosen et al. |
| 9,734,822 B1 | 8/2017 | Sundaram et al. |
| 9,747,011 B2 | 8/2017 | Lewis et al. |
| 9,747,899 B2 | 8/2017 | Pogue et al. |
| 9,747,920 B2 | 8/2017 | Ayrapetian et al. |
| 9,747,926 B2 | 8/2017 | Sharifi et al. |
| 9,754,605 B1 | 9/2017 | Chhetri |
| 9,762,967 B2 | 9/2017 | Clarke et al. |
| 9,811,314 B2 | 11/2017 | Plagge et al. |
| 9,813,810 B1 | 11/2017 | Nongpiur |
| 9,820,036 B1 | 11/2017 | Tritschler et al. |
| 9,820,039 B2 | 11/2017 | Lang |
| 9,826,306 B2 | 11/2017 | Lang |
| 9,865,259 B1 * | 1/2018 | Typrin .................... G10L 17/22 |
| 9,881,616 B2 | 1/2018 | Beckley et al. |
| 10,079,015 B1 * | 9/2018 | Lockhart ................ G10L 15/22 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0034280 A1 | 3/2002 | Infosino |
| 2002/0072816 A1 | 6/2002 | Shdema et al. |
| 2002/0124097 A1 | 9/2002 | Isely et al. |
| 2003/0040908 A1 | 2/2003 | Yang et al. |
| 2003/0072462 A1 | 4/2003 | Hlibowicki |
| 2003/0157951 A1 | 8/2003 | Hasty |
| 2004/0024478 A1 | 2/2004 | Hans et al. |
| 2005/0164664 A1 | 7/2005 | Difonzo et al. |
| 2005/0195988 A1 | 9/2005 | Tashev et al. |
| 2005/0268234 A1 | 12/2005 | Rossi, Jr. et al. |
| 2005/0283330 A1 | 12/2005 | Laraia et al. |
| 2006/0147058 A1 | 7/2006 | Wang |
| 2006/0190968 A1 | 8/2006 | Jung et al. |
| 2006/0247913 A1 | 11/2006 | Huerta et al. |
| 2006/0262943 A1 | 11/2006 | Oxford |
| 2007/0018844 A1 | 1/2007 | Sutardja |
| 2007/0019815 A1 | 1/2007 | Asada et al. |
| 2007/0033043 A1 | 2/2007 | Hyakumoto |
| 2007/0071255 A1 | 3/2007 | Schobben |
| 2007/0076131 A1 | 4/2007 | Li et al. |
| 2007/0140058 A1 | 6/2007 | McIntosh et al. |
| 2007/0142944 A1 | 6/2007 | Goldberg et al. |
| 2008/0090537 A1 | 4/2008 | Sutardja |
| 2008/0248797 A1 | 10/2008 | Freeman et al. |
| 2008/0301729 A1 | 12/2008 | Broos et al. |
| 2009/0003620 A1 | 1/2009 | McKillop et al. |
| 2009/0005893 A1 | 1/2009 | Sugii et al. |
| 2009/0018828 A1 | 1/2009 | Nakadai et al. |
| 2009/0076821 A1 | 3/2009 | Brenner et al. |
| 2009/0197524 A1 | 8/2009 | Haff et al. |
| 2009/0228919 A1 | 9/2009 | Zott et al. |
| 2009/0238377 A1 | 9/2009 | Ramakrishnan et al. |
| 2009/0326949 A1 | 12/2009 | Douthitt et al. |
| 2010/0014690 A1 | 1/2010 | Wolff et al. |
| 2010/0023638 A1 | 1/2010 | Bowman |
| 2010/0075723 A1 | 3/2010 | Min et al. |

(56) References Cited

U.S. PATENT DOCUMENTS

| | | |
|---|---|---|
| 2010/0179874 A1 | 7/2010 | Higgins et al. |
| 2010/0211199 A1 | 8/2010 | Naik et al. |
| 2011/0033059 A1 | 2/2011 | Bhaskar et al. |
| 2011/0091055 A1 | 4/2011 | Leblanc |
| 2011/0145581 A1 | 6/2011 | Malhotra et al. |
| 2011/0267985 A1 | 11/2011 | Wilkinson et al. |
| 2011/0276333 A1 | 11/2011 | Wang et al. |
| 2011/0280422 A1 | 11/2011 | Neumeyer et al. |
| 2011/0299706 A1 | 12/2011 | Sakai |
| 2012/0131125 A1 | 5/2012 | Seidel et al. |
| 2012/0148075 A1 | 6/2012 | Goh et al. |
| 2012/0163603 A1 | 6/2012 | Abe et al. |
| 2012/0177215 A1 | 7/2012 | Bose et al. |
| 2012/0297284 A1 | 11/2012 | Matthews, III et al. |
| 2013/0006453 A1 | 1/2013 | Wang et al. |
| 2013/0024018 A1 | 1/2013 | Chang et al. |
| 2013/0058492 A1 | 3/2013 | Silzle et al. |
| 2013/0066453 A1 | 3/2013 | Seefeldt |
| 2013/0148821 A1 | 6/2013 | Sorensen |
| 2013/0179173 A1 | 7/2013 | Lee et al. |
| 2013/0183944 A1 | 7/2013 | Mozer et al. |
| 2013/0191122 A1 | 7/2013 | Mason |
| 2013/0216056 A1 | 8/2013 | Thyssen |
| 2013/0317635 A1 | 11/2013 | Bates et al. |
| 2013/0329896 A1 | 12/2013 | Krishnaswamy et al. |
| 2013/0331970 A1 | 12/2013 | Beckhardt et al. |
| 2013/0332165 A1 | 12/2013 | Beckley et al. |
| 2013/0343567 A1 | 12/2013 | Triplett et al. |
| 2014/0003611 A1 | 1/2014 | Mohammad et al. |
| 2014/0003635 A1 | 1/2014 | Mohammad et al. |
| 2014/0006026 A1 | 1/2014 | Lamb et al. |
| 2014/0064501 A1 | 3/2014 | Olsen et al. |
| 2014/0075306 A1 | 3/2014 | Rega |
| 2014/0094151 A1 | 4/2014 | Klappert et al. |
| 2014/0100854 A1 | 4/2014 | Chen et al. |
| 2014/0167931 A1 | 6/2014 | Lee et al. |
| 2014/0195252 A1 | 7/2014 | Gruber et al. |
| 2014/0244013 A1 | 8/2014 | Reilly |
| 2014/0258292 A1 | 9/2014 | Thramann et al. |
| 2014/0270282 A1 | 9/2014 | Tammi et al. |
| 2014/0274185 A1 | 9/2014 | Luna et al. |
| 2014/0274203 A1* | 9/2014 | Ganong, III ...... H04W 52/0251 455/556.1 |
| 2014/0277650 A1 | 9/2014 | Zurek et al. |
| 2014/0363022 A1 | 12/2014 | Dizon et al. |
| 2015/0010169 A1 | 1/2015 | Popova et al. |
| 2015/0016642 A1 | 1/2015 | Walsh et al. |
| 2015/0063580 A1 | 3/2015 | Huang et al. |
| 2015/0086034 A1 | 3/2015 | Lombardi et al. |
| 2015/0104037 A1 | 4/2015 | Lee et al. |
| 2015/0154976 A1 | 6/2015 | Mutagi |
| 2015/0170645 A1* | 6/2015 | Di Censo ................ G10L 15/22 704/275 |
| 2015/0180432 A1 | 6/2015 | Gao et al. |
| 2015/0189438 A1 | 7/2015 | Hampiholi et al. |
| 2015/0200454 A1 | 7/2015 | Heusdens et al. |
| 2015/0222987 A1 | 8/2015 | Angel, Jr. et al. |
| 2015/0228274 A1 | 8/2015 | Leppänen et al. |
| 2015/0253292 A1 | 9/2015 | Larkin et al. |
| 2015/0253960 A1 | 9/2015 | Lin et al. |
| 2015/0271593 A1 | 9/2015 | Sun et al. |
| 2015/0280676 A1 | 10/2015 | Holman et al. |
| 2015/0296299 A1 | 10/2015 | Klippel et al. |
| 2015/0302856 A1 | 10/2015 | Kim et al. |
| 2015/0341406 A1 | 11/2015 | Rockefeller et al. |
| 2015/0363061 A1 | 12/2015 | De, III et al. |
| 2015/0363401 A1 | 12/2015 | Chen et al. |
| 2015/0371657 A1 | 12/2015 | Gao et al. |
| 2015/0380010 A1 | 12/2015 | Srinivasan |
| 2016/0007116 A1 | 1/2016 | Holman |
| 2016/0021458 A1 | 1/2016 | Johnson et al. |
| 2016/0029142 A1 | 1/2016 | Isaac et al. |
| 2016/0036962 A1 | 2/2016 | Rand et al. |
| 2016/0042748 A1 | 2/2016 | Jain et al. |
| 2016/0057522 A1 | 2/2016 | Choisel et al. |
| 2016/0077710 A1 | 3/2016 | Lewis et al. |
| 2016/0088392 A1 | 3/2016 | Huttunen et al. |
| 2016/0093304 A1 | 3/2016 | Kim et al. |
| 2016/0098393 A1 | 4/2016 | Hebert |
| 2016/0155443 A1* | 6/2016 | Khan ..................... G06F 1/3203 704/275 |
| 2016/0157035 A1 | 6/2016 | Russell et al. |
| 2016/0173578 A1 | 6/2016 | Sharma et al. |
| 2016/0212538 A1 | 7/2016 | Fullam et al. |
| 2016/0225385 A1 | 8/2016 | Hammarqvist |
| 2016/0232451 A1 | 8/2016 | Scherzer |
| 2016/0234204 A1 | 8/2016 | Rishi et al. |
| 2016/0239255 A1 | 8/2016 | Chavez et al. |
| 2016/0260431 A1 | 9/2016 | Newendorp et al. |
| 2016/0314782 A1 | 10/2016 | Klimanis |
| 2016/0352915 A1 | 12/2016 | Gautama |
| 2016/0353218 A1 | 12/2016 | Starobin et al. |
| 2017/0003931 A1 | 1/2017 | Dvortsov et al. |
| 2017/0026769 A1 | 1/2017 | Patel |
| 2017/0060526 A1 | 3/2017 | Barton et al. |
| 2017/0070478 A1 | 3/2017 | Park et al. |
| 2017/0076720 A1* | 3/2017 | Gopalan ................. G06F 3/167 |
| 2017/0078824 A1 | 3/2017 | Heo |
| 2017/0084292 A1 | 3/2017 | Yoo |
| 2017/0090864 A1 | 3/2017 | Jorgovanovic |
| 2017/0092278 A1 | 3/2017 | Evermann et al. |
| 2017/0092297 A1 | 3/2017 | Sainath et al. |
| 2017/0103755 A1 | 4/2017 | Jeon et al. |
| 2017/0110144 A1* | 4/2017 | Sharifi .................... G10L 17/08 |
| 2017/0125037 A1 | 5/2017 | Shin |
| 2017/0177585 A1 | 6/2017 | Rodger et al. |
| 2017/0178662 A1 | 6/2017 | Ayrapetian et al. |
| 2017/0193999 A1 | 7/2017 | Aleksic et al. |
| 2017/0206896 A1 | 7/2017 | Ko et al. |
| 2017/0214996 A1 | 7/2017 | Yeo |
| 2017/0236512 A1 | 8/2017 | Williams et al. |
| 2017/0242651 A1 | 8/2017 | Lang et al. |
| 2017/0242653 A1 | 8/2017 | Lang et al. |
| 2017/0270919 A1 | 9/2017 | Parthasarathi et al. |
| 2017/0353789 A1 | 12/2017 | Kim et al. |
| 2018/0033428 A1 | 2/2018 | Kim et al. |
| 2018/0130469 A1* | 5/2018 | Gruenstein ............. G10L 15/08 |

FOREIGN PATENT DOCUMENTS

| | | |
|---|---|---|
| EP | 1349146 A1 | 10/2003 |
| EP | 1389853 A1 | 2/2004 |
| EP | 2351021 B1 | 9/2017 |
| JP | 2001236093 A | 8/2001 |
| JP | 2004347943 A | 12/2004 |
| JP | 2004354721 A | 12/2004 |
| JP | 2005284492 A | 10/2005 |
| JP | 2008079256 A | 4/2008 |
| JP | 2008158868 A | 7/2008 |
| JP | 2010141748 A | 6/2010 |
| JP | 2013037148 A | 2/2013 |
| JP | 2014071138 A | 4/2014 |
| JP | 2014137590 A | 7/2014 |
| KR | 20100111071 A | 10/2010 |
| WO | 200153994 | 7/2001 |
| WO | 2003093950 A2 | 11/2003 |
| WO | 2015037396 A1 | 3/2015 |
| WO | 2015178950 A1 | 11/2015 |
| WO | 2016033364 A1 | 3/2016 |
| WO | 2017039632 A1 | 3/2017 |

OTHER PUBLICATIONS

Notice of Allowance dated Aug. 17, 2017, issued in connection with U.S. Appl. No. 15/131,244, filed Apr. 18, 2016, 9 pages.
Notice of Allowance dated Aug. 22, 2017, issued in connection with U.S. Appl. No. 15/273,679, filed Sep. 22, 2016, 5 pages.
Notice of Allowance dated Jan. 22, 2018, issued in connection with U.S. Appl. No. 15/178,180, filed Jun. 9, 2016, 9 pages.
Notice of Allowance dated Dec. 29, 2017, issued in connection with U.S. Appl. No. 15/131,776, filed Apr. 18, 2016, 13 pages.
Palm, Inc., "Handbook for the Palm VII Handheld," May 2000, 311 pages.

(56) References Cited

OTHER PUBLICATIONS

Presentations at WinHEC 2000, May 2000, 138 pages.
Tsiami et al. "Experiments in acoustic source localization using sparse arrays in adverse indoors environments", 2014 22nd European Signal Processing Conference, Sep. 1, 2014, 5 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Notice of Allowance dated Aug. 16, 2017, issued in connection with U.S. Appl. No. 15/098,892, filed Apr. 14, 2016, 9 pages.
Notice of Allowance dated Dec. 15, 2017, issued in connection with U.S. Appl. No. 15/223,218, filed Jul. 29, 2016, 7 pages.
Notice of Allowance dated Jun. 14, 2017, issued in connection with U.S. Appl. No. 15/282,554, filed Sep. 30, 2016, 11 pages.
Notice of Allowance dated Feb. 14, 2017, issued in connection with U.S. Appl. No. 15/229,855, filed Aug. 5, 2016, 11 pages.
Notice of Allowance dated Aug. 14, 2017, issued in connection with U.S. Appl. No. 15/098,867, filed Apr. 14, 2016, 10 pages.
Notice of Allowance dated Dec. 13, 2017, issued in connection with U.S. Appl. No. 15/784,952, filed Oct. 16, 2017, 9 pages.
Notice of Allowance dated Jul. 12, 2017, issued in connection with U.S. Appl. No. 15/098,805, filed Apr. 14, 2016, 8 pages.
Notice of Allowance dated Dec. 4, 2017, issued in connection with U.S. Appl. No. 15/277,810, filed Sep. 27, 2016, 5 pages.
Non-Final Office Action dated Sep. 6, 2017, issued in connection with U.S. Appl. No. 15/131,254, filed Apr. 18, 2016, 13 pages.
Non-Final Office Action dated Jun. 30, 2017, issued in connection with U.S. Appl. No. 15/277,810, filed Sep. 27, 2016, 13 pages.
Non-Final Office Action dated Oct. 26, 2017, issued in connection with U.S. Appl. No. 15/438,744, filed Feb. 21, 2017, 12 pages.
Non-Final Office Action dated Jan. 26, 2017, issued in connection with U.S. Appl. No. 15/098,867, filed Apr. 14, 2016, 16 pages.
Non-Final Office Action dated Jul. 25, 2017, issued in connection with U.S. Appl. No. 15/273,679, filed Jul. 22, 2016, 11 pages.
Non-Final Office Action dated Apr. 19, 2017, issued in connection with U.S. Appl. No. 15/131,776, filed Apr. 18, 2016, 12 pages.
Non-Final Office Action dated Sep. 14, 2017, issued in connection with U.S. Appl. No. 15/178,180, filed Jun. 9, 2016, 16 pages.
Non-Final Office Action dated Jan. 13, 2017, issued in connection with U.S. Appl. No. 15/098,805, filed Apr. 14, 2016, 11 pages.
Non-Final Office Action dated Dec. 12, 2016, issued in connection with U.S. Appl. No. 15/098,718, filed Apr. 14, 2016, 11 pages.
Non-Final Office Action dated Jan. 10, 2018, issued in connection with U.S. Appl. No. 15/438,725, filed Feb. 21, 2017, 15 pages.
Non-Final Office Action dated Jan. 10, 2018, issued in connection with U.S. Appl. No. 15/229,868, filed Aug. 5, 2016, 13 pages.
Non-Final Office Action dated Jan. 10, 2018, issued in connection with U.S. Appl. No. 15/098,718, filed Apr. 14, 2016, 15 pages.
Non-Final Office Action dated Mar. 9, 2017, issued in connection with U.S. Appl. No. 15/098,760, filed Apr. 14, 2016, 13 pages.
Non-Final Office Action dated Feb. 8, 2017, issued in connection with U.S. Appl. No. 15/098,892, filed Apr. 14, 2016, 17 pages.
Non-Final Office Action dated Feb. 7, 2017, issued in connection with U.S. Appl. No. 15/131,244, filed Apr. 18, 2016, 12 pages.
Final Office Action dated Apr. 13, 2018, issued in connection with U.S. Appl. No. 15/131,254, filed Apr. 18, 2016, 18 pages.
Final Office Action dated Apr. 13, 2018, issued in connection with U.S. Appl. No. 15/438,744, filed Feb. 21, 2017, 20 pages.
Non-Final Office Action dated Mar. 16, 2018, issued in connection with U.S. Appl. No. 15/681,937, filed Aug. 21, 2017, 5 pages.
Non-Final Office Action dated Apr. 18, 2018, issued in connection with U.S. Appl. No. 15/811,468, filed Nov. 13, 2017, 14 pages.
Non-Final Office Action dated Feb. 20, 2018, issued in connection with U.S. Appl. No. 15/211,748, filed Jul. 15, 2016, 31 pages.
Non-Final Office Action dated May 22, 2018, issued in connection with U.S. Appl. No. 15/946,599, filed Apr. 5, 2018, 19 pages.
Non-Final Office Action dated Feb. 6, 2018, issued in connection with U.S. Appl. No. 15/211,689, filed Jul. 15, 2016, 32 pages.
Non-Final Office Action dated Feb. 6, 2018, issued in connection with U.S. Appl. No. 15/237,133, filed Aug. 15, 2016, 6 pages.
Non-Final Office Action dated Apr. 9, 2018, issued in connection with U.S. Appl. No. 15/804,776, filed Nov. 6, 2017, 18 pages.
Non-Final Office Action dated May 9, 2018, issued in connection with U.S. Appl. No. 15/818,051, filed Nov. 20, 2017, 22 pages.
Notice of Allowance dated Apr. 11, 2018, issued in connection with U.S. Appl. No. 15/719,454, filed Sep. 28, 2017, 15 pages.
Notice of Allowance dated Mar. 20, 2018, issued in connection with U.S. Appl. No. 15/784,952, filed Oct. 16, 2017, 7 pages.
Notice of Allowance dated Mar. 9, 2018, issued in connection with U.S. Appl. No. 15/584,782, filed May 2, 2017, 8 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Corrected Notice of Allowability dated Mar. 8, 2017, issued in connection with U.S. Appl. No. 15/229,855, filed Aug. 5, 2016, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report dated Oct. 30, 2017, issued in connection with EP Application No. 17174435.2, 11 pages.
Final Office Action dated Oct. 6, 2017, issued in connection with U.S. Appl. No. 15/098,760, filed Apr. 14, 2016, 25 pages.
Final Office Action dated Aug. 11, 2017, issued in connection with U.S. Appl. No. 15/131,776, filed Apr. 18, 2016, 7 pages.
Final Office Action dated Jun. 15, 2017, issued in connection with U.S. Appl. No. 15/098,718, filed Apr. 14, 2016, 15 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
Freiberger, Karl, "Development and Evaluation of Source Localization Algorithms for Coincident Microphone Arrays," Diploma Thesis, Apr. 1, 2010, 106 pages.
International Searching Authority, International Search Report and Written Opinion dated Nov. 22, 2017, issued in connection with International Application No. PCT/US2017/054063, filed on Sep. 28, 2017, 11 pages.
International Searching Authority, International Search Report and Written Opinion dated May 23, 2017, issued in connection with International Application No. PCT/US2017/018739, Filed on Feb. 21, 2017, 10 pages.
International Searching Authority, International Search Report and Written Opinion dated Oct. 23, 2017, issued in connection with International Application No. PCT/US2017/042170, filed on Jul. 14, 2017, 15 pages.

(56) References Cited

OTHER PUBLICATIONS

International Searching Authority, International Search Report and Written Opinion dated Oct. 24, 2017, issued in connection with International Application No. PCT/US2017/042227, filed on Jul. 14, 2017, 16 pages.
International Searching Authority, International Search Report and Written Opinion dated May 30, 2017, issued in connection with International Application No. PCT/US2017/018728, Filed on Feb. 21, 2017, 11 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Morales-Cordovilla et al. "Room Localization for Distant Speech Recognition," Proceedings of Interspeech 2014, Sep. 14, 2014, 4 pages.
Non-Final Office Action dated Jun. 1, 2017, issued in connection with U.S. Appl. No. 15/223,218, filed Jul. 29, 2016, 7 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21, 2017, 11 pages.

\* cited by examiner

| PREAMBLE 902 | SFD 904 | DESTINATION ADDRESS 906 | SOURCE ADDRESS 908 | PAYLOAD 910 | FCS 912 |

| COMMAND 1002A | TIME STAMP 1004A | TIME STAMP 1006A | TIME STAMP 1008A | TIME STAMP 1010A | ... |

| COMMAND 1002B | COORDINATES 1004B | COORDINATES 1006B | ... |

| COMMAND 1002C | ... |

| COMMAND 1002D | ... |

WAKE-WORD DETECTION SUPPRESSION

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 9 show example messages to cause a NMD to disregard a wake word;

FIGS. 10A, 10B, 10C, 10D illustrate example instructions to cause a NMD to disregard a wake word;

Figure 1:
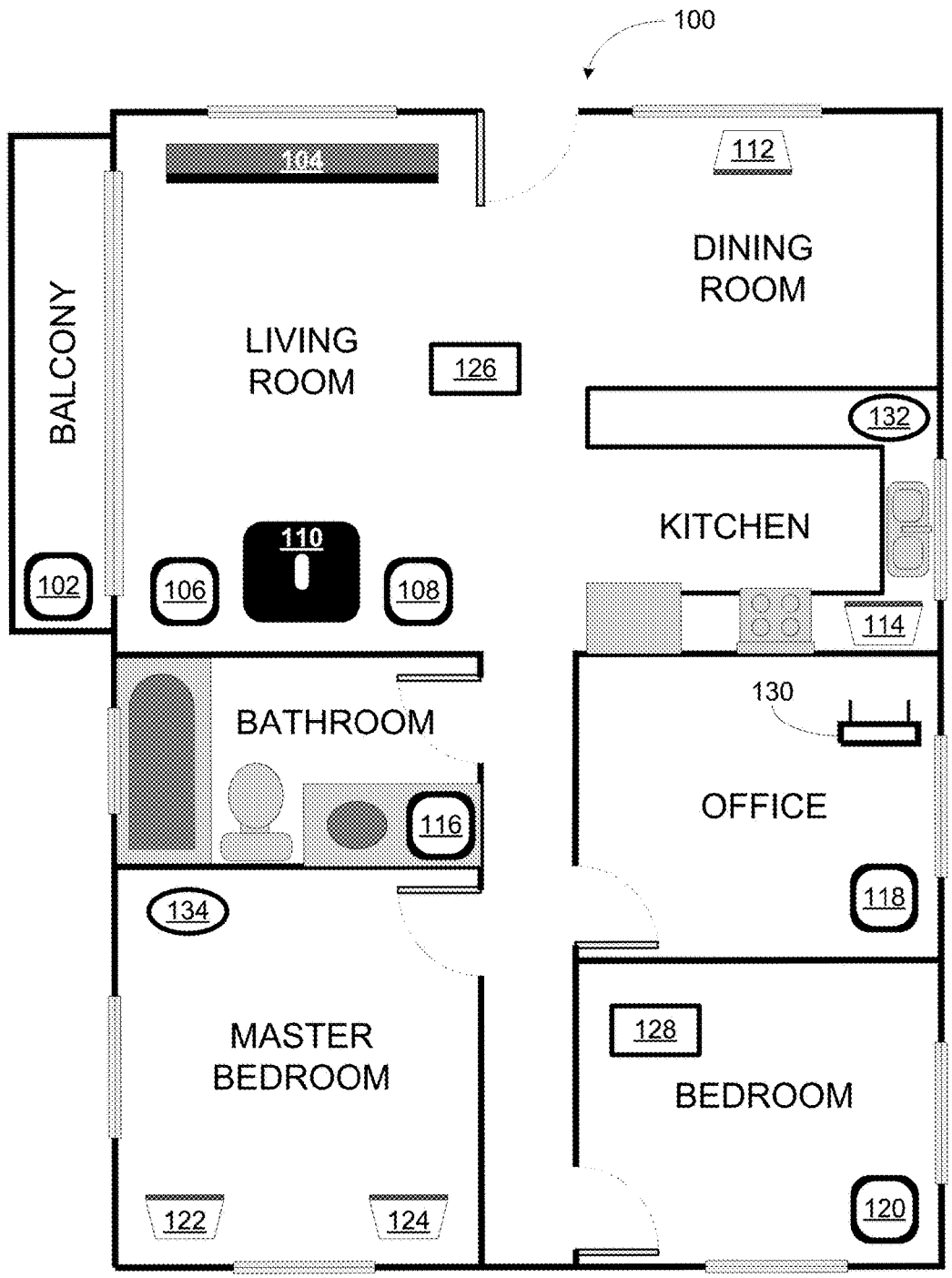
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Networked microphone devices (NMDs) may be used to control a household using voice control. A NMD may be or may be part of, for example, a SONOS® playback device, server, or system capable of receiving voice input via a microphone. In some examples, the playback device is a SONOS® playback device. Additionally, a NMD may be or may be part of another device, server, or system (e.g., an AMAZON® ECHO®, APPLE® PHONE®, among other examples) capable of receiving voice inputs via a microphone. U.S. application Ser. No. 15/438,749 filed on Feb. 21, 2017 and titled, "Voice Control of a Media Playback System," which is hereby incorporated by reference in its entirety, provides examples of voice-enabled household architectures. Voice control can be beneficial for various devices with a "smart" home, such as playback devices, wireless illumination devices, thermostats, door locks, home automation, as well as other examples.

In some implementations, voice inputs detected by a NMD are sent to a voice service for processing. A NMD together with a playback device may operate as a microphone/speaker interface to the voice service. Voice inputs are detected by a microphone of the NMD and then transmitted to a particular voice service for processing. The voice service may then return a command or other result of the voice input.

Utterance of a wake word may invoke a voice service. For instance, in querying the AMAZON® voice service, a user might speak the wake word "Alexa" followed by a voice input. Other examples include "Ok, Google" for querying the GOOGLE® voice service and "Hey, Siri" for querying the APPLE® voice service. Other examples of wake words and voice services exist. Upon detecting a wake word, a NMD may respond by listening, via a microphone, for a voice command following the wake word. This response is referred to herein as the "wake response" of a NMD.

In some circumstances, playback of audio content that includes a wake word may falsely trigger the wake-response of a NMD. Wake-words for many voice services are pre-existing words chosen from the vocabulary of an existing language. For instance, several popular voice services use given names as wake words (e.g., "Alexa" and "Siri"). Accordingly, in some circumstances, recorded audio content such as a talk show, a film, a television show, a podcast, an Internet streaming video, among others, may include a wake word or similar. Playback of such audio content in range of a NMD may falsely trigger the NMD, which may be undesirable for many reasons including that it may interfere with enjoyment of the audio content.

For example, a television may play back a commercial for a given voice service. During the commercial, an actor or actress might speak the wake word for the voice service, perhaps to demonstrate how the voice service is invoked. An NMD in the same room as the television might detect the audio output from the television, and invoke the voice service when the NMD detects the wake word in the commercial. This may be undesirable. Moreover, since the commercial may play on many televisions simultaneously, the commercial may trigger many NMDs at the same time, which may cause an undesirable surge in requests to the voice service.

To avoid their commercials causing false triggering, an operator of a voice service may mark the portion(s) of their commercial that includes a wake word and program their NMDs to ignore these marked portion(s). For instance, the operator may mix in a tone or other audio marker into commercials for the voice service and program their NMDs to ignore wake words that are detected in conjunction with this audio marker. This implementation may be useful in limited instances, such as commercials for the voice service, where the operator of the voice service can embed this marker into the audio content. However, this implementation is not useful with respect to the vast majority of other audio content over which the operator of the voice service has no control.

Example techniques described herein may involve processing audio content to be played back by a playback device before the audio content is audibly played back by the playback device, determining whether the audio content includes one or more wake words, and notifying one or more NMDs to disregard the wake word(s) when they are played back by the playback device. In this manner, the techniques may help prevent false triggering of NMDs. Notably, such techniques may be applicable to any recorded audio content to be played back by a playback device.

For instance, a playback device may receive audio content for playback. Before playing the audio content, the playback device stores the audio content in memory (e.g., in a buffer), and runs a wake word detection algorithm on the audio content. If any wake words are detected in the audio content, the playback device (which may be a NMD itself) causes one or more NMDs to disregard these wake words when the playback device ultimately plays back the audio content.

As another example, a NMD may receive audio content that has been designated for playback by a playback device. Before the audio content is played back by the playback device, the NMD may run a wake word detection algorithm on the audio content. If any wake words are detected in the audio content, the NMD may cause itself (and possibly other NMDs in the vicinity) to disregard these wake words when they are ultimately played back by the playback device.

An NMD may disregard a wake word using any of a variety of techniques. In some instances, the NMD may be instructed to not detect the wake word as it is played back by the playback device, perhaps by instructing the NMD to stop listening for wake words, by disabling the microphone array of the NMD for a period of time, or by creating a listening NULL in the direction of the playback device, among other examples. Alternatively, the NMD may proceed to initially detect the wake word, but be instructed to suppress its programmed wake response to invoke a voice service in response to detecting the wake word, perhaps by disregarding wake words during certain periods of time or by disregarding all recorded audio during certain periods of time.

When processing the audio content prior to the playback device audibly playing back that audio content, a processing device (such as a playback device or NMD) can also determine what sections of the recorded audio content contain the wake words. These sections can be defined by a time period within the audio content such as a start and stop time for the wake word (e.g., a wake word in a podcast starts at 33:52.543 and ends at 33:54.013). When the audio content is played back, NMDs in the vicinity can be instructed to ignore wake words during these time periods.

As another example, the processing device may count the number of wake words in the audio content (or in a portion of the audio content). For instance, a playback device that is processing the audio content of a commercial might detect four instances of a wake word in that commercial. Then, the playback device may instruct NMDs in the vicinity of the playback device to ignore wake words until they have detected a number of wake words equal to the count (e.g., to ignore the next four wake words).

In other examples, the processing device may dynamically insert an audio tone or other marker in the recorded audio content to designate wake words detected in the audio content. Then, when the audio content is played back by the playback device, a NMD that detects the audio marker in conjunction with the wake word can be instructed to ignore that instance of the wake word. Multiple NMDs in audible range of the playback device may each detect the wake word and ignore the wake word in response to detecting the associated audio marker.

Example techniques may involve disabling wake response of one or more NMDs. A first implementation may include receiving, via a network interface, data representing audio content for playback by the playback device, and before the audio content is played back by the playback device, detecting, in the audio content, one or more wake words for one or more voice services. The first implementation may also include causing one or more networked microphone devices to disable its respective wake response to the detected one or more wake words during playback of the audio content by the playback device, where, when enabled, the wake response of a given networked microphone device to a particular wake word causes the given networked microphone device to listen, via a microphone, for a voice command following the particular wake word. The first implementation may further include playing back the audio content via one or more speakers.

A second implementation may include receiving, via a network interface, data representing audio content for playback by a playback device. The second implementation may also include, before the audio content is played back by the playback device, detecting, in the audio content, one or more wake words for one or more voice services. The second implementation may further include disabling a wake response of the networked microphone device to the detected one or more wake words during playback of the audio content by the playback device, and while the playback device is playing back the audio content, detecting the played back audio content via the microphone.

A third implementation may include receiving, via an interface of the computing system, audio content for playback by one or more playback devices. The third implementation may also include before the audio content is played back by the playback device, detecting, in the audio content, one or more wake words for one or more voice services. The third implementation may further include causing one or more networked microphone devices to disable their respective wake responses to the detected one or more wake words during playback of the audio content by the playback device.

A fourth implementation may include receiving, via the network interface, an instruction to disable a wake response of the networked microphone device to one or more wake words. The fourth implementation may also include detecting, via the microphone, audio content being played back by one or more playback devices. The fourth implementation may further include determining that the detected audio content includes one or more wake words and, in response to the received instruction, disabling the wake response of the networked microphone device to the one or more wake words in the detected audio content.

Each of the these example implementations may be embodied as a method, a device configured to carry out the implementation, a system of devices configured to carry out the implementation, or a non-transitory computer-readable medium containing instructions that are executable by one or more processors to carry out the implementation, among other examples. It will be understood by one of ordinary skill in the art that this disclosure includes numerous other embodiments, including combinations of the example features described herein. Further, any example operation described as being performed by a given device to illustrate a technique may be performed by any suitable devices, including the devices described herein. Yet further, any device may cause another device to perform any of the operations described herein.

While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102, 104, 106, 108, 110, 112, 114, 116, 118, 120, 112, and 124, control devices 126 and 128, and a wired or wireless network router 130. Also present in FIG. 1 are NMDs 132 and 134.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
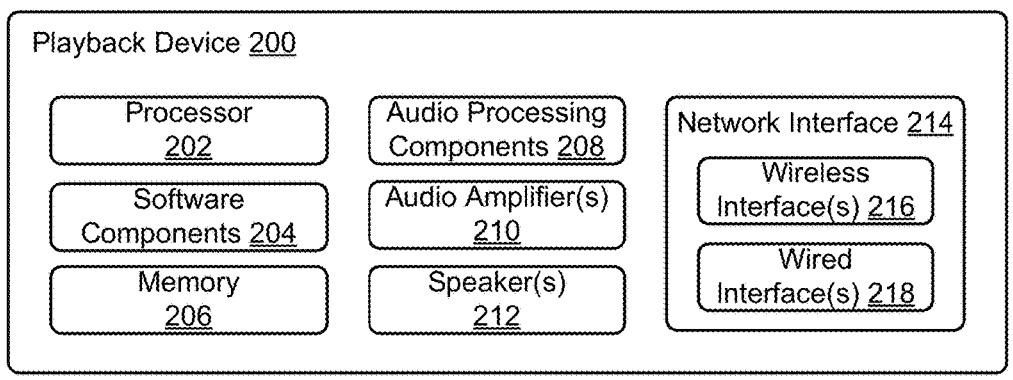
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference in its entirety, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones.

Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
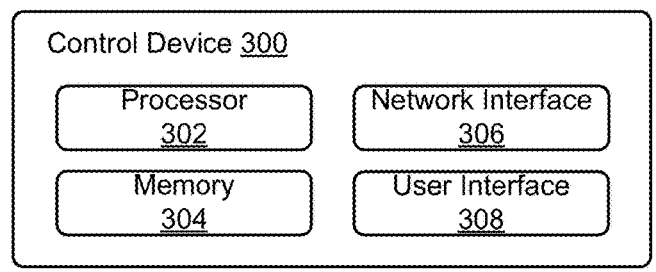
FIG. 3 shows a functional block diagram of an example control device.

FIG. 3 shows a functional block diagram of an example control device 300 that may be configured to be one or both of the control devices 126 and 128 of the media playback system 100. Control device 300 may also be referred to as a controller 300. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
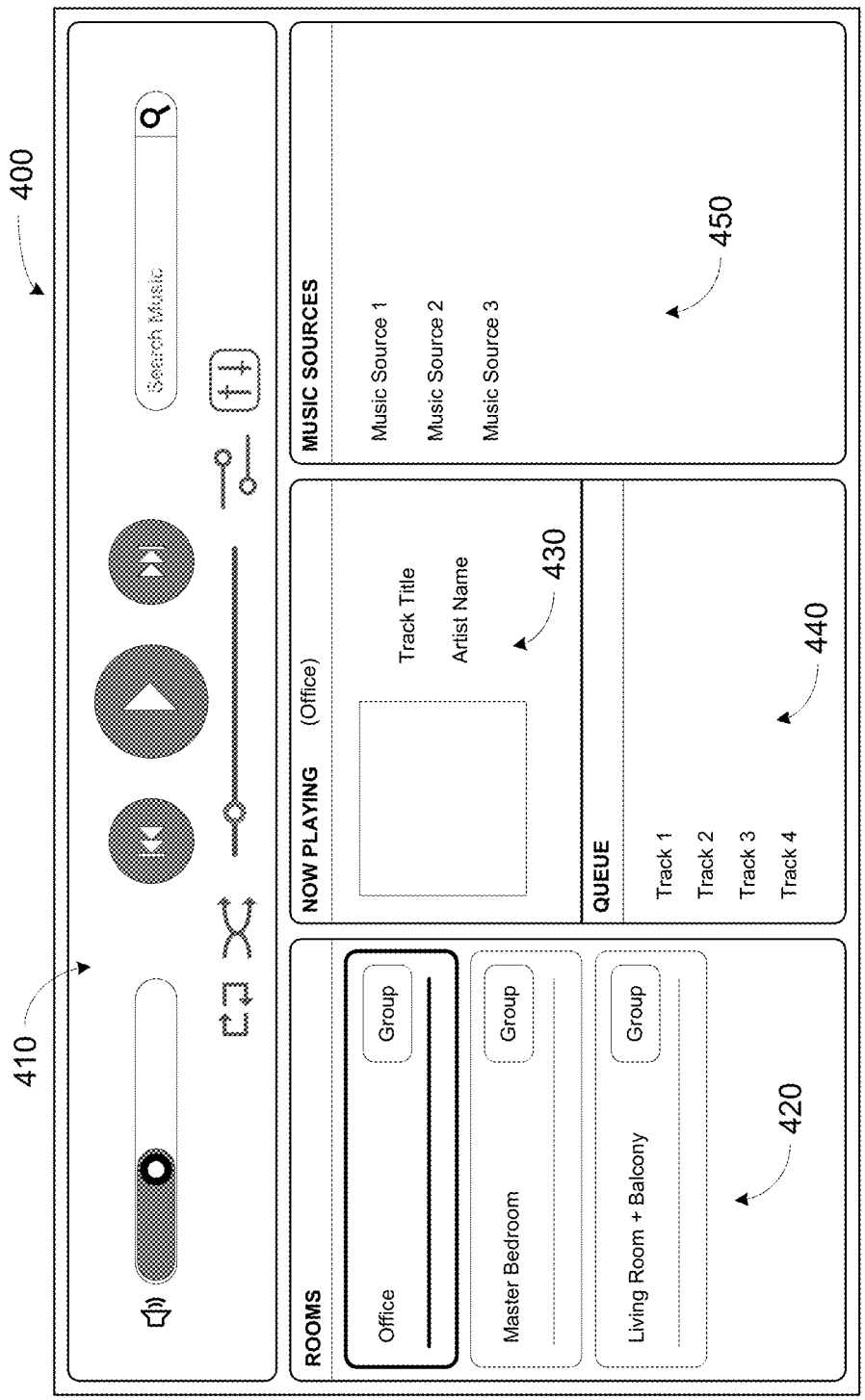
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Processing System

Figure 5:
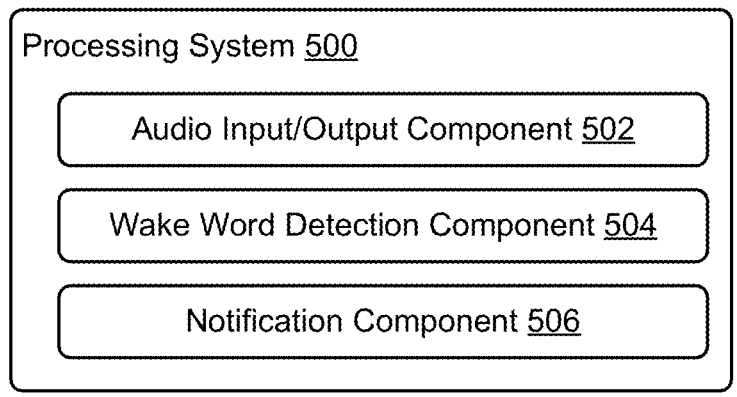
FIG. 5 shows an example processing system.

FIG. 5 shows a functional block diagram of an example processing system 500 that includes an audio input/output component 502, a wake word detection component 504, and a notification component 506. In operation, processing system 500 detects wake words within recorded audio content and provides notifications to NMDs to ignore or otherwise suppress their programmed wake response to detecting a wake word. Within various embodiments, processing system 500 may be implemented in a playback device, a NMD, or a separate processing device, such as a cloud server, among other examples. In some embodiments, various components of the processing system (and/or functionality thereof) are distributed among multiple devices.

In operation, audio input/output component 502 receives, via an input interface, recorded audio content designated for playback by a playback device. For instance, a control device (such as control device 126 or 128 of FIG. 1) may instruct a playback device (e.g., any playback device of FIG. 1) to play back certain audio content, perhaps by causing that content to be placed in a playback queue of the playback device to cause the playback device to retrieve the audio content, by directing an audio content stream to the playback device, or by directing audio content to the playback device via an analog or digital line-in interface, among other examples. The audio/input component 502 of the processing system 500 receives this recorded audio content before the audio content is played back by the playback device.

As noted above, in some examples, processing system 500 is implemented within a playback device. In such embodiments, the playback device 500 already has access to the audio content necessarily for playback. For instance, the playback device may receive the audio content from a network source (e.g., a streaming media service or a mobile device) via a network interface over one or more types of networks, such as wide area networks (WAN), local area networks (LAN), and personal area networks (PAN), among other possibilities. Alternatively, the playback device may receive the audio content via an analog (e.g., RCA) or digital (e.g., TosLink® or HDMI®) line-in interface.

In other examples, processing system 500 is implemented within a NMD or other processing device that is separate from the playback device. In such embodiments, processing system 500 may receive the audio content via a network interface from the playback device or from the source of the audio content, among other examples. In another example, a line-in interface may provide the audio content directly to the NMD or a playback device may receive the audio content via a line-in interface and relay the content to the processing system 500 over one or more networks.

For instance, processing system 500 may have access to the playback queue of the playback device. As noted above, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. The processing system 500 may similarly use such an identifier to retrieve audio content from a local audio content source or a networked audio content source, prior to playback by the playback device.

In some implementations, the playback queue is stored in data storage of the playback device. In further implementations, the playback queue is stored on a cloud server. The playback queue stored on the cloud server (i.e., a cloud queue) may be an instance or representation of a playback queue stored on the playback device. The cloud queue may include a playback pointer or other status information representing the current state of playback on the playback device.

In some instances, processing system 500 may convert the received audio content into a format suitable for wake word detection. For instance, if the audio content is provided to the audio/input component 502 via an analog line-in interface, the processing system 500 may digitize the analog audio (e.g., using a software or hardware-based analog-to-digital converter). As another example, if the received audio content is received in a digital form that is unsuitable for analysis, the processing system 500 may transcode the recording into a suitable format.

Wake-word detection component 504 analyzes the received audio content to determine if any wake words are present in the recording. The wake word detection component 504 may analyze the received audio content using a wake word detection algorithm. Example wake word detection algorithms accept an audio recording as input and provide an indication of whether a wake word is present in the recording as output.

In some implementations, the wake word detection component 504 may use the same algorithm on the recording as utilized by NMDs for detecting wake words in audio recorded via a microphone. During typical operation, an example NMD constantly records audio and provides the recorded audio stream into a wake-word detection algorithm, in order to determine if the recorded audio includes a wake word. Here, instead of providing audio that was recorded by the microphone of an NMD to the wake word detection algorithm, the wake word detection component 504 provides the pre-recorded audio content designated for playback.

During analysis, the wake word detection component 504 additionally determines where each wake word occurs in the received audio content. For instance, the wake word detection component 504 may divide the received audio content into segments of known length. Then, the wake word detection component 504 can determine where in the recording that the wake-word occurs by identifying the segment that the wake word was detected. For example, if each segment is 5 seconds long and the wake word was detected in the fourth segment, the wake word must be located between 15 and 20 seconds into the recording. The wake word detection component 504 may record the portions of the audio content containing a wake word, perhaps using one or more timestamps (e.g., a time stamp indicating a start time for the wake-word, and perhaps another timestamp indicating a stop time for that wake word). Such time stamps may define respective time offsets from the start of an audio recording or from another particular position in the audio recording. In some instances, the wake word detection component 504 may separate the audio recording into overlapping segments, to avoid breaking apart a wake word into unrecognizable portions. Other techniques for determining the location of a wake word within the audio recording can be utilized as well.

Within examples, processing system 500 may buffer the received audio content in memory. For instance, processing system 500 may store the received audio content in a first-in-first-out buffer (e.g., a circular buffer). In such implementations, portions of the received audio are stored in the buffer when they are received, and are removed as they are processed to determine if the received audio content contains wake words.

In some instances, the wake word detection component 504 runs multiple wake word detections algorithms on the received audio content simultaneously (or substantially simultaneously). As noted above, different voice services (e.g. AMAZON's ALEXA®, APPLE's SIRI®, or MICROSOFT's CORTANA®) each use a different wake word for invoking their respective voice service. To support multiple services, the wake word detection component 504 may run the received audio content through the wake word detection algorithm for each supported voice service in parallel.

If one or more wake words are detected in the audio content, notification component 506 notifies one or more NMDs (e.g., NMDs 132 and/or 134 of FIG. 1). This notification causes a NMD to disregard the detected wake words when they are played back in the course of a playback device playing back the audio content that includes the wake words. For instance, the notification component 506 may send instructions over a network interface to one or more NMDs to disregard certain wake words or a certain number of wake words.

In some instances, the notification component 506 may prevent a NMD from detecting the wake word as it is played back by the playback device. For instance, the notification component 506 may instruct the NMD to stop listening for wake words (e.g., to stop processing recorded audio) for a period of time. Alternatively, the notification component 506 may instruct the NMD to disable its microphone array temporarily (e.g., during the period of time corresponding to when the wake words are expected to be played by the playback device). As yet another example, the notification component 506 may instruct the NMD to create a listening NULL in the direction of the playback device using its microphone array, so that the NMD does not detect the wake word. Other examples are possible as well.

Alternatively, the NMD may detect the wake word, but the notification component 506 instructs the NMD to suppress its programmed wake response to invoke a voice service in response to detecting the wake word. For instance, the notification component 506 may instruct the NMD to disregard wake words during certain periods of time or to disregard all audio during certain periods of time. Other examples are possible as well.

When processing the audio content prior to the playback device audibly playing back that audio content, a processing device (such as a playback device or NMD) can also determine what sections of the recorded audio content contain the wake words. These sections can be defined by a time period within the audio content such as a start and stop time for the wake word (e.g., a wake word in a podcast starts at 33:52.543 and ends at 33:54.013). When the audio content is played back, NMDs in the vicinity can be instructed to ignore wake words during these time periods.

As another example, the processing system 500 may count the number of wake words in the audio content (or in a portion of the audio content). For instance, the processing system 500 might detect three wake words in an example audio content (e.g., a television show). As noted above, such instances may include any combination of wake words, including different wake words for different voice services. Then, the processing system 500 may instruct NMDs in the vicinity to ignore wake words until they have detected a number of wake words equal to the count (e.g., to ignore the next three wake words).

In other examples, processing system 500 may dynamically insert an audio tone or other marker in the recorded audio content to designate wake words detected in the audio content. Then, when the audio content is played back by the playback device, a NMD that detects the audio marker in conjunction with the wake word can be instructed to ignore that instance of the wake word. If multiple NMDs are in audible range of the playback device, each NMD that detect a wake word may ignore it in response to detecting the associated audio marker. In some cases, the audio marker is composed of audio frequencies that are outside the range of human hearing (e.g., above 20 kHz), so that the inserted tone is not noticeable by human listeners.

In some implementations, processing system 500 operates as an intermediary between a source of audio content and the playback device. For instance, in implementations where the processing system 500 notifies NMDs using an audio marker, the processing system modifies the audio content designated for playback by the playback device. In such implementations, the processing system 500 may receive the audio content from an audio source (e.g., via a network or line-in interface), analyze the audio content, and provide the modified audio content to the playback device for playback, perhaps via a network interface.

Alternatively, as noted above, processing system 500 is implemented in the playback device itself. In such instances, after analyzing the audio content, the playback device may proceed to play back the audio content. Further, as noted above, in some cases, the playback device may be configured to play back audio content in synchrony with one or more additional playback devices (e.g., in a zone group, stereo pair, or surround sound configuration). In such circumstances, the playback device may provide the (possibly modified) audio content to the one or more additional playback devices, perhaps via a network interface.

In further examples, processing system 500 is implemented in a NMD. In such instances, processing system 500 may cause the NMD itself to ignore the wake words in audio content when it is played back. Further, the NMD may instruct other NMDs to ignore the wake word. For instance, NMD 132 may instruct NMD 134 to ignore the wake word. Further, if a NMD is implemented in a playback device (e.g., playback device 104), the NMD/playback device may instruct other NMD's (which may themselves be implemented in playback devices) to ignore the wake words.

f. Example Plurality of Networked Devices

Figure 6:
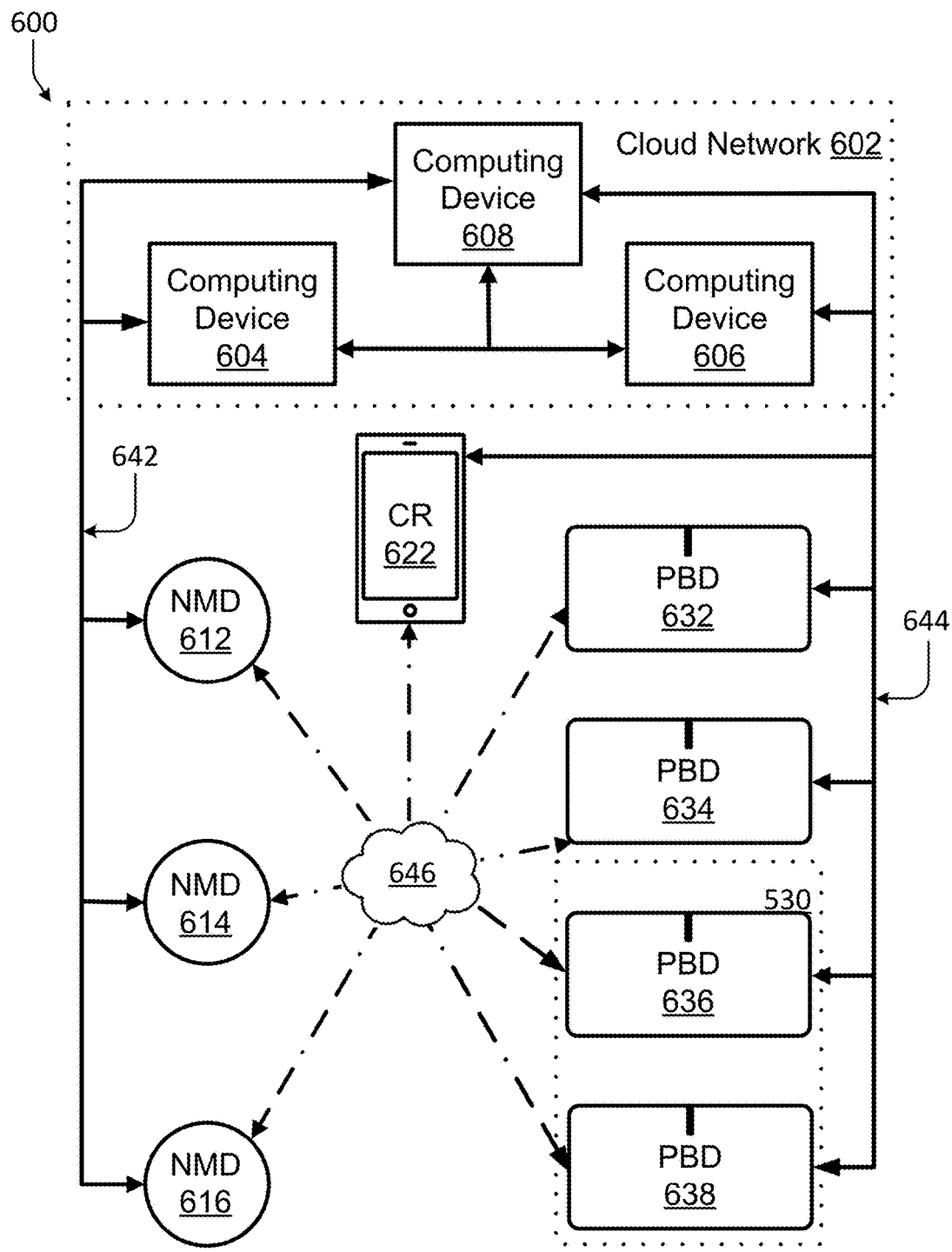
FIG. 6 shows an example plurality of network devices according to aspects described herein.

FIG. 6 shows an example plurality of devices 600 that may be configured to provide an audio playback experience based on voice control. One having ordinary skill in the art will appreciate that the devices shown in FIG. 6 are for illustrative purposes only, and variations including different and/or additional devices may be possible. As shown, the plurality of devices 600 includes computing devices 604, 606, and 608; network microphone devices (NMDs) 612, 614, and 616; playback devices (PBDs) 632, 634, 636, and 638; and a controller device (CR) 622.

Each of the plurality of devices 600 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 604, 606, and 608 may be part of a cloud network 602. The cloud network 602 may include additional computing devices. In one example, the computing devices 604, 606, and 608 may be different servers. In another example, two or more of the computing devices 604, 606, and 608 may be modules of a single server. Analogously, each of the computing device 604, 606, and 608 may include one or more modules or servers. For ease of illustration purposes herein, each of the computing devices 604, 606, and 608 may be configured to perform particular functions within the cloud network 602. For instance, computing device 608 may be a source of audio content for a streaming music service.

As shown, the computing device 604 may be configured to interface with NMDs 612, 614, and 616 via communication path 642. NMDs 612, 614, and 616 may be components of one or more "Smart Home" systems. In one case, NMDs 612, 614, and 616 may be physically distributed throughout a household, similar to the distribution of devices shown in FIG. 1. In another case, two or more of the NMDs 612, 614, and 616 may be physically positioned within relative close proximity of one another. Communication path 642 may comprise one or more types of networks, such as a WAN including the Internet, LAN, and/or PAN, among other possibilities.

In one example, one or more of the NMDs 612, 614, and 616 may be devices configured primarily for audio detection. In another example, one or more of the NMDs 612, 614, and 616 may be components of devices having various primary utilities. For instance, as discussed above in connection to FIGS. 2 and 3, one or more of NMDs 612, 614, and 616 may be the microphone(s) 220 of playback device 200 or the microphone(s) 310 of network device 300. Further, in some cases, one or more of NMDs 612, 614, and 616 may be the playback device 200 or network device 300. In an example, one or more of NMDs 612, 614, and/or 616 may include multiple microphones arranged in a microphone array.

As shown, the computing device 606 may be configured to interface with CR 622 and PBDs 632, 634, 636, and 638 via communication path 644. In one example, CR 622 may be a network device such as the network device 200 of FIG. 2. Accordingly, CR 622 may be configured to provide the controller interface 400 of FIG. 4. Similarly, PBDs 632, 634, 636, and 638 may be playback devices such as the playback device 300 of FIG. 3. As such, PBDs 632, 634, 636, and 638 may be physically distributed throughout a household as shown in FIG. 1. For illustration purposes, PBDs 636 and 638 may be part of a bonded zone 630, while PBDs 632 and 634 may be part of their own respective zones. As described above, the PBDs 632, 634, 636, and 638 may be dynamically bonded, grouped, unbonded, and ungrouped. Communication path 644 may comprise one or more types of networks, such as a WAN including the Internet, LAN, and/or PAN, among other possibilities.

In one example, as with NMDs 612, 614, and 616, CR 622 and PBDs 632, 634, 636, and 638 may also be components of one or more "Smart Home" systems. In one case, PBDs 632, 634, 636, and 638 may be distributed throughout the same household as the NMDs 612, 614, and 616. Further, as suggested above, one or more of PBDs 632, 634, 636, and 638 may be one or more of NMDs 612, 614, and 616.

The NMDs 612, 614, and 616 may be part of a local area network, and the communication path 642 may include an access point that links the local area network of the NMDs 612, 614, and 616 to the computing device 604 over a WAN (communication path not shown). Likewise, each of the NMDs 612, 614, and 616 may communicate with each other via such an access point.

Similarly, CR 622 and PBDs 632, 634, 636, and 638 may be part of a local area network and/or a local playback network as discussed in previous sections, and the communication path 644 may include an access point that links the local area network and/or local playback network of CR 622 and PBDs 632, 634, 636, and 638 to the computing device 606 over a WAN. As such, each of the CR 622 and PBDs 632, 634, 636, and 638 may also communicate with each over such an access point.

In one example, communication paths 642 and 644 may comprise the same access point. In an example, each of the NMDs 612, 614, and 616, CR 622, and PBDs 632, 634, 636, and 638 may access the cloud network 602 via the same access point for a household.

As shown in FIG. 6, each of the NMDs 612, 614, and 616, CR 622, and PBDs 632, 634, 636, and 638 may also directly communicate with one or more of the other devices via communication means 646. Communication means 646 as described herein may involve one or more forms of communication between the devices, according to one or more network protocols, over one or more types of networks, and/or may involve communication via one or more other network devices. For instance, communication means 646 may include one or more of for example, Bluetooth™ (IEEE 802.15), NFC, Wireless direct, and/or Proprietary wireless, among other possibilities.

In one example, CR 622 may communicate with NMD 612 over Bluetooth™, and communicate with PBD 634 over another local area network. In another example, NMD 614 may communicate with CR 622 over another local area network, and communicate with PBD 636 over Bluetooth. In a further example, each of the PBDs 632, 634, 636, and 638 may communicate with each other according to a spanning tree protocol over a local playback network, while each communicating with CR 622 over a local area network, different from the local playback network. Other examples are also possible.

In some cases, communication means between the NMDs 612, 614, and 616, CR 622, and PBDs 632, 634, 636, and 638 may change depending on types of communication between the devices, network conditions, and/or latency demands. For instance, communication means 646 may be used when NMD 616 is first introduced to the household with the PBDs 632, 634, 636, and 638. In one case, the NMD 616 may transmit identification information corresponding to the NMD 616 to PBD 638 via NFC, and PBD 638 may in response, transmit local area network information to NMD 616 via NFC (or some other form of communication). However, once NMD 616 has been configured within the household, communication means between NMD 616 and PBD 638 may change. For instance, NMD 616 may subsequently communicate with PBD 638 via communication path 642, the cloud network 602, and communication path 644. In another example, the NMDs and PBDs may never communicate via local communications means 646. In a further example, the NMDs and PBDs may communicate primarily via local communications means 646. Other examples are also possible.

In an illustrative example, NMDs 612, 614, and 616 may be configured to receive voice inputs to control PBDs 632, 634, 636, and 638. The available control commands may include any media playback system controls previously discussed, such as playback volume control, playback transport controls, music source selection, and grouping, among other possibilities. In one instance, NMD 612 may receive a voice input to control one or more of the PBDs 632, 634, 636, and 638. In response to receiving the voice input, NMD 612 may transmit via communication path 642, the voice input to computing device 604 for processing. In one example, the computing device 604 may convert the voice input to an equivalent text command, and parse the text command to identify a command. Computing device 604 may then subsequently transmit the text command to the computing device 606. In another example, the computing device 604 may convert the voice input to an equivalent text command, and then subsequently transmit the text command to the computing device 606. The computing device 606 may then parse the text command to identify one or more playback commands.

For instance, if the text command is "Play 'Track 1' by 'Artist 1' from 'Streaming Service 1' in 'Zone 1'," The computing device 606 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 608, and "Zone 1" may be the bonded zone 630. As such, upon identifying the URL and one or both of PBDs 636 and 638, the computing device 606 may transmit via communication path 644 to one or both of PBDs 636 and 638, the identified URL for playback. One or both of PBDs 636 and 638 may responsively retrieve audio content from the computing device 608 according to the received URL, and begin playing "Track 1" by "Artist 1" from "Streaming Service 1."

In yet another example, the computing device 604 may perform some processing to identify the relevant command or intent of the user and provide information regarding media content relevant to the voice input to the computing device 606. For example, the computing device 604 may perform the speech-to-text conversion of the voice input and analyze the voice input for a command or intent (e.g., play, pause, stop, volume up, volume down, skip, next, group, ungroup) along with other information about how to execute the command. The computing device 604 or the computing device 606 may determine what PBD commands correspond to the command or intent determined by the computing device 604. The command or intent determined from the voice input and/or other information related to executing the command may be transmitted from the computing device 604 to the computing device 606. The processing on the computing device 604 may be performed by an application, a module, add-on software, an integration with the native networked microphone system software platform, and/or the native networked microphone system software platform.

One having ordinary skill in the art will appreciate that the above is just one illustrative example, and that other implementations are also possible. In one case, operations performed by one or more of the plurality of devices 600, as described above, may be performed by one or more other devices in the plurality of device 600. For instance, the conversion from voice input to the text command may be alternatively, partially, or wholly performed by another device or devices, such as NMD 612, computing device 606, PBD 636, and/or PBD 638. Analogously, the identification of the URL may be alternatively, partially, or wholly performed by another device or devices, such as NMD 612, computing device 604, PBD 636, and/or PBD 638.

f. Example Network Microphone Device

Figure 7:
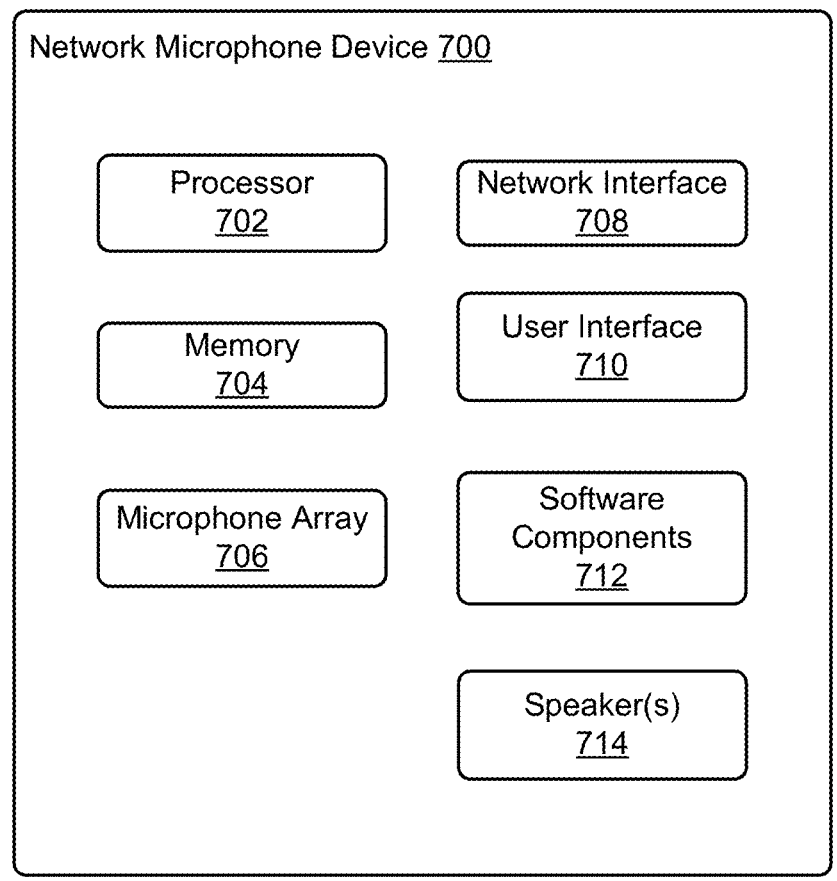
FIG. 7 shows a function block diagram of an example network microphone device according to aspects described herein.

FIG. 7 shows a function block diagram of an example network microphone device 700 that may be configured to be one or more of NMDs 712, 714, and 716 of FIG. 7. As shown, the network microphone device 700 includes a processor 702, memory 704, a microphone array 706, a network interface 708, a user interface 710, software components 712, and speaker(s) 714. One having ordinary skill in the art will appreciate that other network microphone device configurations and arrangements are also possible. For instance, network microphone devices may alternatively exclude the speaker(s) 714 or have a single microphone instead of microphone array 706.

The processor 702 may include one or more processors and/or controllers, which may take the form of a general or special-purpose processor or controller. For instance, the processing unit 702 may include microprocessors, microcontrollers, application-specific integrated circuits, digital signal processors, and the like. The memory 704 may be data storage that can be loaded with one or more of the software components executable by the processor 702 to perform those functions. Accordingly, memory 704 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 706 may be a plurality of microphones arranged to detect sound in the environment of the network microphone device 700. Microphone array 706 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 706 may be sensitive to a portion of a frequency range. In one example, a first subset of the microphone array 706 may be sensitive to a first frequency range, while a second subset of the microphone array may be sensitive to a second frequency range. The microphone array 706 may further be arranged to capture location information of an audio source (e.g., voice, audible sound) and/or to assist in filtering background noise. Notably, in some embodiments the microphone array may consist of only a single microphone, rather than a plurality of microphones.

The network interface 708 may be configured to facilitate wireless and/or wired communication between various network devices, such as, in reference to FIG. 7, CR 722, PBDs 732-738, computing device 704-708 in cloud network 702, and other network microphone devices, among other possibilities. As such, network interface 708 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 708 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 710 of the network microphone device 700 may be configured to facilitate user interactions with the network microphone device. In one example, the user interface 708 may include one or more of physical buttons, graphical interfaces provided on touch sensitive screen(s) and/or surface(s), among other possibilities, for a user to directly provide input to the network microphone device 700. The user interface 710 may further include one or more of lights and the speaker(s) 714 to provide visual and/or audio feedback to a user. In one example, the network microphone device 700 may further be configured to playback audio content via the speaker(s) 714.

III. Example Techniques for a Playback Device to Disable a Wake-Response

Figure 8:
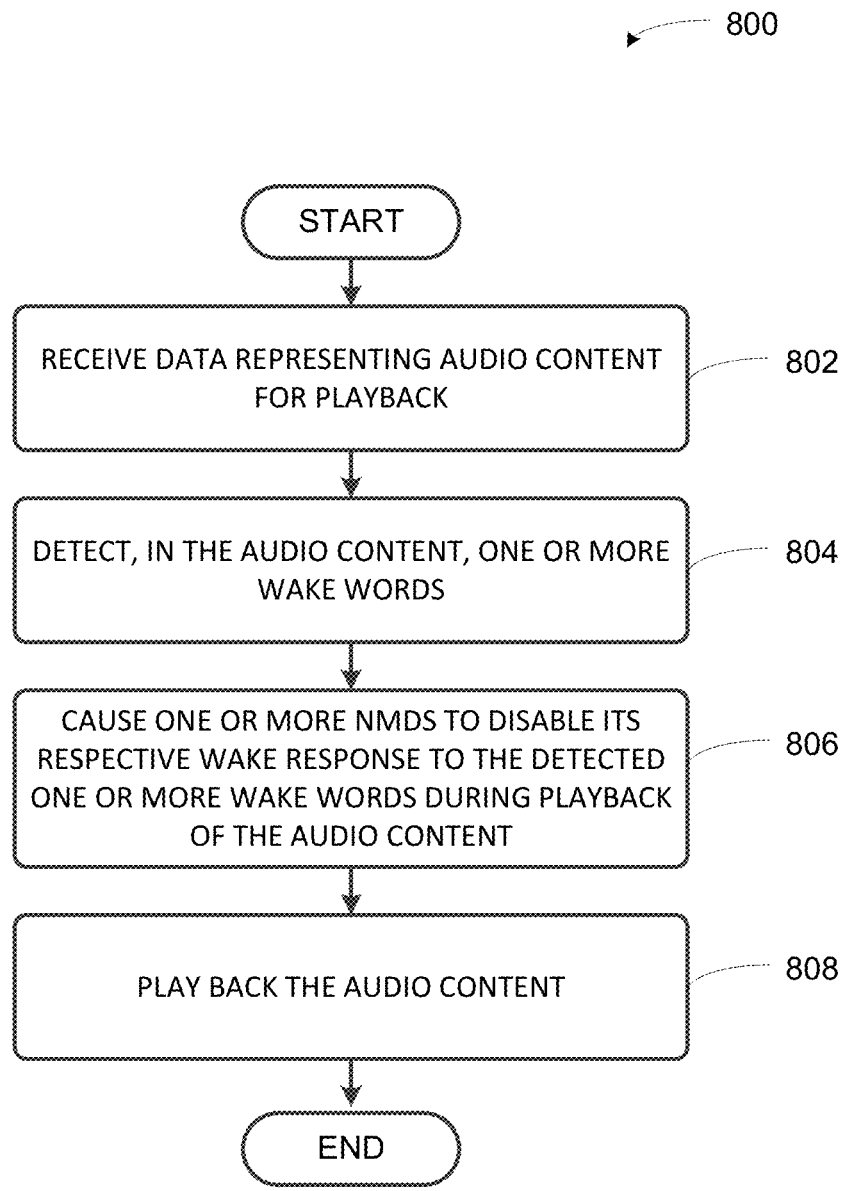
FIG. 8 shows an example flow diagram to disable a wake response of one or more NMDs.

As discussed above, embodiments described herein may involve disabling a wake response. FIG. 8 illustrates an example implementation 800 by which a playback device disables a wake response of one or more NMDs.

a. Receive Data Representing Audio Content for Playback

At block 802, implementation 802 involves receiving data representing audio content for playback. For instance, a playback device may receive audio content for playback by the playback device. Example playback devices include any of playback devices 102, 104, 106, 108, 110, 112, 114, 116, 118, 120, 112, and 124 shown in FIG. 1, which may be implemented as represented by playback device 200 of FIG. 2, for instance. In some implementations, the playback device may include a processing system (e.g., processing system 500) and receive the data representing the audio content using an audio input/output component (such as audio input/output component 502 of FIG. 5).

Example audio content includes one or more audio tracks, a talk show, a film, a television show, a podcast, an Internet streaming video, among many possible other forms of audio content. The audio content may include audio content that is accompanied by video (e.g., an audio track of a video) or audio that is unaccompanied by video.

The playback device may receive the audio content via an input interface, which may be a wired or wireless network interface or an analog or digital line-in interface, among other examples. For instance, the playback device may receive the audio content from a network source via a network interface over one or more types of networks, such as wide area networks (WAN), local area networks (LAN), and personal area networks (PAN), among other possibilities.

The playback device may receive the data representing the audio content from a local or remote audio source. For instance, the playback device may receive the audio content from a local media server or other device on a local area network, from a medium (such as a CD, DVD, Blu-Ray, flash memory, or hard drive) that is read by the playback device or by another device in communication with the playback device (e.g., over a local area network via a network interface), or from data storage on the playback device itself. The playback device may receive the audio content as an audio content stream, perhaps from one or more cloud servers. For instance, the playback device may retrieve an audio content stream from a URL via a network interface. Alternatively, the playback device may receive the audio content from a line-in interface on the playback device or on another device in communication with the playback device (e.g., over a local area network via a network interface).

In some cases, the playback device may receive audio content in analog format, perhaps via an analog line-in interface. In such instances, the playback device digitizes the analog audio (e.g., using a software or hardware-based analog-to-digital converter) into a format suitable for processing. Alternatively, a device in communication with the playback device may receive audio content in analog format, digitize the audio content, and transmit data representing the audio content to the playback device.

As noted above, the received audio content is designed for playback by the playback device. For instance, a control device (such as control device 126 or 128 of FIG. 1) may instruct the playback device to play back certain audio content, perhaps by causing that content to be placed in a playback queue of the playback device. Placing an audio track or other audio content into such a queue causes the playback device to retrieve the audio content, perhaps after playback is initiated via a control that is on the control device or on the playback device itself (e.g., a Play/Pause button). The playback device may retrieve the audio content from the local or remote audio source by directing an audio content stream to the playback device via a network interface or by directing audio content to the playback device via an analog or digital line-in interface, among other examples.

Within examples, the playback device may store at least a portion of the received audio content in memory. For instance, the playback device may buffer received audio content in a first-in-first-out buffer (e.g., a circular buffer). In such implementations, portions of the received audio are stored in the buffer when they are received, and are removed as they are processed which enables the playback device to determine if the received audio content contains wake words.

b. Detect, in the Audio Content, One or More Wake Words

Referring back to FIG. 8, at block 804, implementation 800 involves detecting, in the audio content, one or more wake-words before the audio content is played back by the playback device. For instance, the playback device may analyze the received data representing the audio content to determine if wake words for any voice services are represented in the audio content, such that when the audio content is played back, the wake words will be played audibly. As noted above, in some implementations, the playback device may include a processing system (e.g., processing system 500) and detect wake words within the audio content using a wake-word detection component (such as wake-word detection component 504 of FIG. 5).

The playback device may analyze the received audio content using one or more wake word detection algorithms. Example wake word detection algorithms accept an audio recording as input and provide an indication of whether a wake word is present in the recording as output. Many first- and third-party wake word detection algorithms are known and commercially available. For instance, operators of a voice service may make their algorithm available for use in third-party devices. Alternatively, an algorithm may be trained to detect certain wake-words.

In some implementations, the playback device may use the same or similar algorithm on the received data representing the audio content as utilized by NMDs for detecting wake words in audio recorded via a microphone. In such a manner, the playback device may detect the same or similar wake words in the audio content as a NMD would detect if the audio content was played back in audible range of the NMDs. However, given that NMDs typically run wake word detection algorithms on microphone-recorded audio that was spoken by a wide variety of human voices in varying environmental conditions (e.g., possibly a noisy household), a wake word algorithm operating on received audio content without such variability may be even more effective in detecting wake words.

During analysis, the playback device may determine where each wake word occurs in the received audio content. After identifying the portions of the audio content that are determined to include a wake word, the playback device may note these portions of the audio content using one or more timestamps (e.g., a time stamp indicating a start time for the wake-word, and perhaps another timestamp indicating a stop time for that wake word). Ultimately, these time-stamps may be used to disable the wake-response of one or more NMDs to the wake-words corresponding to each time-stamp.

In one example, the playback device may divide the received audio content into segments of known length. Then, the playback device identifies the portion(s) of the audio content—i.e., the segments—that include a wake word by identifying the segment(s) in which the wake word(s) were detected. For example, if each segment is 3 seconds long and the wake word was detected in the fourth segment, the wake word is located between 9 and 12 seconds into the recording. In some instances, the playback device may separate the audio recording into overlapping segments, to avoid breaking apart a wake word into unrecognizable portions (e.g., one section representing "Hey" and another segment representing "Siri"). Other techniques for determining the location of a wake word within the audio recording can be utilized as well.

In some instances, the playback device runs multiple wake word detections algorithms on the received audio content simultaneously (or substantially simultaneously). As noted above, different voice services (e.g. AMAZON's ALEXA®, APPLE's SIRI®, or MICROSOFT's COR-TANA®) may each use a different wake word for invoking their respective voice service. Further, some voice services may allow user selection of a preferred wake word or to configure a custom wake word. To support multiple services (and/or different wake words), the playback device may run the received audio content through the wake word detection algorithm for each supported voice service in parallel. For instance, the playback device may apply, to the audio content before the audio content is played back by the playback device, a first audio detection algorithm for a first voice service to detect at least one first wake word for the first voice service and apply, to the audio content before the audio content is played back by the playback device, a second audio detection algorithm for a second voice service to detect at least one second wake word for the second voice service. The playback device may apply additional audio detection algorithms to the audio content as well, possibly for respective voice services.

c. Cause One or More NMDs to Disable its Respective Wake Response to the Detected One or More Wake Words During Playback of the Audio Content In FIG. 8, at block 806, implementation 800 involves causing one or more networked microphone devices to disable its respective wake response to the detected one or more wake-words during playback of the audio content. For instance, the playback device may cause NMDs that are in audible range of the playback device to disable their respective wake response to the detected one or more wake-words during playback of the audio content by the playback device. As noted above, the playback device may implement a processing system 500 that includes a notification component (e.g., notification component 506 of FIG. 5), and use the notification component to cause the one or more NMDs to disable its respective wake response to the detected one or more wake-words during playback of the audio content by the playback device.

As noted above, the wake response of an NMD refers to its programmed response to detecting a wake word. When a wake response is enabled, in response to detecting a wake word, the wake response of an NMD causes the NMD to listen, via a microphone, for a voice command following the particular wake word. The NMD invokes a voice service to carry out the voice command. However, when the wake response is disabled, the NMD might not listen for the voice command and will not invoke the voice service to carry out the voice command.

In some implementations, the playback device itself includes an NMD (e.g., NMD 700 is implemented within the playback device). In such implementations, the playback device disables the wake response of its own NMD to the detected one or more wake-words while the playback device is playing back the audio content. For instance, an instance of processing system 500 implemented in the playback device may notify the NMD of the one or more wake-words and their corresponding playback times, so as to cause the NMD to disable the wake response the NMD to the detected one or more wake-words. For instance, the processing system may notify the NMD by changing a flag in RAM to disable the wake response, or by messaging the NMD using an internal communications bus, among other examples. Then, while playing back the audio content, the NMD of the playback device may record, via a microphone, the audio content being played back by the playback device, and disable respective wake responses of the NMD to one or more wake words within the recorded audio content.

Within example implementations, the playback device may cause all networked microphone devices within a household to disable their respective wake responses. For instance, playback device 104 shown in FIG. 1 may cause NMDs 132 and 134 to disable their respective wake responses when playback device 104 plays back audio content containing one or more wake words. Further, if any of playback devices 102 or 106-124 implement an NMD, playback device 104 may cause these playback devices to disable their respective wake responses when playback device 104 plays back audio content containing the one or more wake words. Yet further, if playback device 104 itself implements an NMD, or if control device 126 or 128 implement a NMD, playback device 104 may cause these devices to disable their respective wake responses when playback device 104 plays back the audio content.

Alternatively, the playback device may cause a subset of NMDs within a household to disable their respective wake responses. For instance, the playback device may cause NMDs within audible range of the playback device to disable their respective wake responses. Alternatively, the playback device may cause NMDs that have been associated with the playback device to disable their respective wake responses.

Audible range may be determined using any suitable technique. In some implementations, audible range is established based on a playback configuration of the playback device. For instance, if the playback device is in a synchronous playback configuration with one or more playback devices, these playback devices may be assumed to be in audible range of the playback device. Accordingly, if any of these playback devices implement an NMD, the respective wake-responses of these playback devices are disabled. The playback device may determine that such NMDs are in audible range of the playback devices by referring to a configuration of the playback device, which may be stored in one or more state variables that are synchronized across playback devices in the household.

In other examples, audible range is established during a set-up procedure (e.g. a calibration procedure). During such a set-up procedure, NMDs within the household may be instructed to listen for an audio signal (e.g., a tone) that is played back by playback devices in the household. If an NMD can detect the audio signal via its microphone, that NMD can be assumed to be within audible range. Playback devices within the household may be instructed to cycle through playback of the audio signal at different volumes, so as to determine the sets of NMDs that are in audible range of each playback device at any given volume level. Example calibration procedures may involve output of a calibration sound, which may also serve as the audio signal to be detected by NMDs within the household.

To illustrate, during an example set-up procedure, control device 126 of FIG. 1 may instruct playback devices in the Master Bedroom Zone to output an audio signal (i.e., playback devices 122 and 124). At most volume levels, this output is detected by NMD 134. However, as the volume level is increased, other NMDs start to detect the output as well. For instance, and playback device 118 and control device 128 may each implement an NMD and detect audio signal output at relatively higher volume levels. As such, via the example set-up procedure, NMD 134 is established as being in audible range of playback devices 122 and 124 at certain volume range (e.g., 5%-100%) while playback device 118 and control device 128 are considered is established as being in audible range of playback devices 122 and 124 at certain higher volume ranges (e.g., volume levels >80%). This procedure can be repeated for other playback devices and NMDs within the household.

In other examples, a NMD may be paired with one or more playback devices based on a known physical proximity. For instance, referring back to FIG. 1, NMD 134 may be paired with playback device 122 and/or 124 as the NMD for the Master Bedroom zone. Such pairing may be configured via a user interface on a control device, such as control device 126 or 128. As another example, NMD 132 may be paired with playback devices 104, 106, 108, 110, 112, and/or 114 on the grounds that NMD 132 is paired with the Kitchen Zone and the Kitchen zone is known to be in physical proximity to the Dining Room and/or Living Room zone or on the grounds that the Kitchen zone is formed into a zone group with the Dining Room or Living Room zone. If a NMD is paired with one or more playback devices, the NMD may be assumed to be within audible range of these playback devices.

Other examples for determining the presence of NMDs that are in proximity to playback devices of a media playback system are described in: application Ser. No. 15/098,867 filed on Apr. 14, 2016, titled "Default Playback Device Designation;" application Ser. No. 15/098,892 filed on Apr. 14, 2016, titled "Default Playback Devices;" application Ser. No. 15/237,133, titled "Audio Response Playback;" and application Ser. No. 15/229,855 filed on Aug. 5, 2016, titled "Determining Direction of Networked Microphone Device Relative to Audio Playback Device." Each of these applications are incorporated by reference in their entirety.

As suggested above, in some cases, the playback device is configured to play back audio in synchrony with one or more additional playback devices, perhaps in a zone group, stereo pair, or surround sound configuration. Such configurations may extend the audible range of the playback device, as any NMD in audible range of the playback device or any of the one or more additional playback devices may falsely trigger in response to wake words in audio content played back by these playback devices in synchrony. As such, if the playback device is currently in a synchronous playback configuration with one or more additional playback devices, the playback device may disable the respective wake responses of NMDs that are in audible range or otherwise associated with these additional playback devices.

In some implementations, the playback device causes the one or more NMDs to disable its respective wake response to the detected one or more wake words by sending, via a network interface to the one or more NMDs, instructions that cause the one or more NMDs to disable their respective wake responses during playback of the received audio content. As noted above, various devices of a media playback system (e.g., control devices, playback devices, and NMDs) may be interconnected via a local area network (e.g., via a local area networked formed by wired or wireless network router 130 of FIG. 1) to permit exchange of instructions and other messaging between the devices within the household. These devices of a media playback system may each be programmed to respond to certain instructions from other devices in the system.

In some examples, such instructions may prevent the one or more NMDs from detecting the wake word as it is played back by the playback device. For instance, the playback device may instruct one or more NMDs to stop listening for wake words (e.g., to stop processing recorded audio) for one or more period of times (i.e., the periods of time corresponding to when the wake words will be played back by the playback device, perhaps notated by time-stamps). Alternatively, the playback device may instruct the one or more NMDs to disable their respective microphones temporarily (e.g., during the period of times noted above). As yet another example, the playback device may instruct the one or more NMDs to create a listening NULL in the direction of the playback device using its microphone array, so that the NMDs do not detect the wake word. Other examples are possible as well. For instance, shortly before the playback device plays a portion of the audio content containing a wake-word, the playback device may send a first message instructing the one or more NMDs to disable wake word detection. Then, shortly after the playback device plays the portion of the audio content containing the wake-word, the playback device may send a second message instructing the one or more NMDs to enable wake word detection.

To illustrate, FIG. 9 depicts example message 900, which a playback device may send to one or more NMDs to cause the one or more NMDs to disable its respective wake response to the detected one or more wake words. Message 900 may conform to a specification, such as the IEEE 802.3 specification (which specifies the structure of an Ethernet packet and frame). As shown, message 900 includes a preamble 902, which includes a pattern of alternating bits by which devices on the network (e.g., NMDs, playback devices, and/or control devices, among others) may synchronize their receiver clocks. Message 900 also includes a start of frame delimiter (SFD) 904, which marks the end of the preamble (the first field of an Ethernet packet) and the beginning of the Ethernet frame portion of the message. Message 900 also includes destination address 906 and source address 908, which indicate the destination (e.g., a NMD) and the source (e.g., the playback device). Message 900 further includes a payload 910. The payload 910 includes instructions to cause an NMD (i.e., the NMD indicated by the destination address 906) to disable its wake response to one or more wake words. Message 900 further includes a frame check sequence (FCS) 912, which is a cyclic redundancy check values that allows detection of corrupted data within the frame as received.

The instructions may be transmitted using two or more Ethernet packets (e.g., two or more of message 900). For instance, the instructions to one NMD may be divided across the payloads of two or more instances of messages 900. Further, instructions to multiple NMDs may each be sent in one or more respective instances of message 900. Other examples are possible as well.

By way of example, FIGS. 10A, 10B, 10C, and 10D illustrate example instructions 1000A, 1000B, 100C, and 100D, which may be transmitted in the payload(s) of one or more messages to a NMD (e.g., payload 910 of message 900). As shown in FIG. 10A, instructions 1000A includes command 1002A to cause a NMD to disable a wake response during certain time periods defined by time stamps 1004A, 1006A, 1008A, 1010A. In some examples, time stamps 1004A and 1006A designate the beginning and end, respectively, of a time period during which the playback device will play back a portion of the audio content containing a first wake word. Similarly, time stamps 1008A and 1010A may designate the beginning and end, respectively, of a time period during which the playback device will play back a portion of the audio content containing a second wake word. Instructions 1000A may include further time stamps that define additional time periods. Alternatively, stamps 1004A, 1006A, 1008A, and 1010A may correspond toe a playback time for a particular frame of audio, a time corresponding to a system clock on the sending or receiving device; or a time corresponding to a global clock that is known to both the NMD and the playback device, among other examples.

FIG. 10B shows instructions 1000B, which include a command 1002B to cause a NMD to create a listening null in certain directions defined by coordinates 1004B and 1006B. Coordinates 1004B and 1006B indicate the directions of respective playback devices relative to the NMD. For instance, referring back to FIG. 1, an example instance of instructions 1000B may include coordinates 1004B and 1006B to indicate the directions of playback devices 122 and 124 relative to NMD 134. In this example, the coordinates 1004B and 1006B may indicate to NMD 134 that playback device 122 is 0° relative to NMD 134 (i.e., directly in front of NMD 134) while playback device 122 is 45° to the left relative to NMD 134. Respective locations of devices within a household relative to one another may be pre-established by a set-up or configuration procedure.

FIGS. 10C and 10D show instructions 1000C and 100D respectively. Instructions 1000C include a command 1002C to cause the receiving NMD to disable wake word detection. The playback device may send such instructions shortly before playing back a portion of the audio content that includes a wake word. Instructions 100D include a command 1002D to cause the receiving NMD to enable wake word detection. The playback device may send such instructions shortly after playing back the portion of the audio content that includes the wake word.

In a further example, the one or more NMDs may detect the wake word, but the playback device instructs the one or more NMDs to suppress its wake response. For instance, the playback device may instruct the one or more NMDs to disregard wake words during certain periods of time or to disregard all audio during certain periods of time. Other examples are possible as well.

As another example, the playback device may count the number of wake words in the audio content (or in a portion of the audio content). For instance, the playback device might detect three wake words in an example audio content. As noted above, such instances may include any combination of wake words, including different wake words for different voice services. Then, the playback device may instruct the one or more NMDs in the vicinity to ignore wake words until they have detected a number of wake words equal to the count (e.g., to ignore the next three wake words).

Alternatively, the playback device causes the one or more NMDs to disable its respective wake response to the detected one or more wake words by dynamically modifying the audio content to incorporate acoustic markers in segments of the audio content. For instance, the playback device may insert (e.g., mix in) in an audio tone or other marker in the recorded audio content to designate wake words detected in the audio content. Then, NMDs can be instructed or pre-programmed to ignore an instance of a wake word if they detect the audio marker in association with the wake word (e.g., shortly before, or concurrently with the wake word). Using such a technique, NMDs in audible range of the playback device need not be pre-determined or estimated. Rather, since the acoustic marker(s) are played back with the audio content, NMDs that are in audible range to detect the audio content (and, as such, may be falsely triggered by this content) are also in range to detect the acoustic marker(s) and responsively disable their wake response. If multiple NMDs are in audible range of the playback device, each NMD that detects a wake word responsively disables its wake response to the wake word in response to detecting the associated acoustic marker.

d. Play Back the Audio Content

In FIG. 8, at block 808, implementation 800 involves playing back the audio content via one or more speakers. The playback device plays back the audio content via one or more audio transducers (e.g., speakers). In some instances, the speakers are co-located with the playback device in the same housing. Alternatively, the playback device may provide amplified audio via speaker jacks to one or more separate passive speakers. As another example, the playback device may play back the audio content by providing line-level audio to an amplifier, which then in turn provides amplified audio via speaker jacks to one or more passive speakers.

As noted above, in some instances, the playback device is configured into a synchronous playback configuration with one or more additional playback devices. In such instances, playing back the audio content involves playing back the audio content in synchrony with the one or more additional playback devices. In some playback configurations (e.g., stereo pair or surround), each playback device in the playback configuration plays back a portion of the audio content in synchrony with the other playback devices in the playback configuration.

In some implementations, the playback device provides the audio content to one or more additional playback devices for playback to facilitate synchronous playback of that audio content with the playback device. In such implementations, the playback device may operate as a group coordinator for the synchrony group including the playback device and the one or more additional playback devices. As group coordinator, the playback device may additionally provide timing information to the one or more additional playback devices to facilitate the synchrony group scheduling synchronous playback. The playback device provides the audio content and/or the timing information via a network interface.

As noted above, in some cases, the playback device modifies the audio content to include acoustic markers. In such embodiments, if the playback device is in a synchrony group, the playback device may provide the modified audio content to other playback devices in the synchrony group. Each playback device in the synchrony group may then play back the modified audio content in synchrony with the other playback devices in the group.

To illustrate, in one example, playback devices 114 and 122 and 124 are in a zone group (i.e., a Kitchen+Master Bedroom zone group) that is configured to play back audio content in synchrony. After detecting wake words in audio content designated for playback by the zone group, playback device 114 may modify the audio content to include acoustic markers to designate the wake words in the audio content. Playback device 114 may then provide the modified audio content to playback device 122 and/or 124, so as to facilitate synchronous playback of the modified audio content.

IV. Example Techniques for a NMD to Disable a Wake-Response

Figure 11:
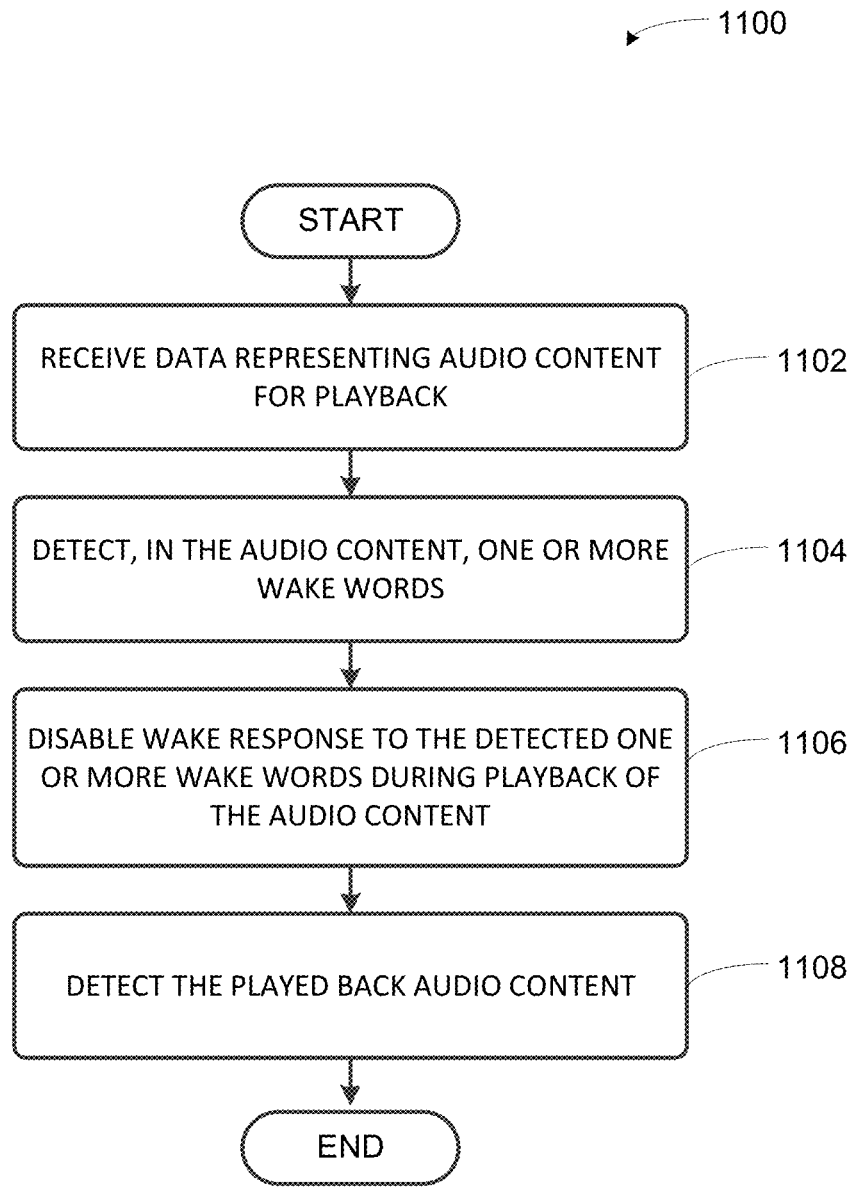
FIG. 11 shows an example flow diagram to disable a wake response of one or more NMDs.

As discussed above, embodiments described herein may involve disabling a wake response. FIG. 11 illustrates an example implementation 1100 by which a NMD disables its wake response to one or more detected wake words.

a. Receive Data Representing Audio Content for Playback

At block 1102, implementation 1100 involves receiving data representing recorded audio content. For instance, NMD may receive audio content for playback by a playback device. Example NMDs include any of NMDS 132 and 134 shown in FIG. 1, which may be implemented as NMD 700 of FIG. 7, for example. Example playback devices include any of playback devices 102, 104, 106, 108, 110, 112, 114, 116, 118, 120, 112, and 124 shown in FIG. 1, which may be implemented as represented by playback device 200 of FIG. 2, for instance. Further example NMDs may include any of these playback devices and/or control devices 126 and 128, as such devices may implement an NMD in addition to their functionality as a playback or control device. The NMD may include a processing system (e.g., processing system 500) and receive the data representing the audio content using an audio input/output component (such as audio input/output component 502 of FIG. 5).

The NMD may receive the audio content via an input interface, which may be a wired or wireless network interface or an analog or digital line-in interface, among other examples. For instance, the NMD may receive the audio content from a network source via a network interface over one or more types of networks, such as WANs, LANs, and PANs, among other possibilities.

The NMD may receive the data representing the audio content from a local or remote audio source. For instance, the NMD may receive the audio content from a local media server or other device on a local area network, from a medium (such as a CD, DVD, Blu-Ray, flash memory, or hard drive) that is read by the NMD or by another device in communication with the NMD (e.g., a playback device that is connected to the NMD over a local area network via a network interface), or from data storage on the NMD itself.

The NMD may receive the audio content as an audio content stream, perhaps from one or more cloud servers. For instance, the NMD may retrieve an audio content stream from a URL via a network interface. Alternatively, the NMD may receive the audio content from a line-in interface on the NMD or on another device in communication with the NMD (e.g., a playback device that is connected to the NMD over a local area network via a network interface).

In some cases, the NMD may receive audio content in analog format, perhaps via an analog line-in interface. In such instances, the NMD digitizes the analog audio (e.g., using a software or hardware-based analog-to-digital converter) into a format suitable for processing. Alternatively, a device in communication with the NMD (e.g., a playback device) may receive audio content in analog format, digitize the audio content, and transmit data representing the audio content to the playback device.

As noted above, the received audio content is designed for playback by a playback device. For instance, a control device (such as control device 126 or 128 of FIG. 1) may instruct a playback device to play back certain audio content, perhaps by causing that content to be placed in a playback queue of the playback device. Placing an audio track or other audio content into such a queue causes the playback device to retrieve the audio content, perhaps after playback is initiated via a control on the control device or on the playback device itself (e.g., a Play/Pause button). The NMD may have access to this queue (e.g., the contents of the queue may be shared with the NMD via a LAN or other network). Given such access, the NMD may retrieve the audio content from the local or remote audio source by directing an audio content stream to the NMD via a network interface or by directing audio content to the NMD via an analog or digital line-in interface, among other examples.

In some cases, the received audio content is designed for playback by two or more playback devices. For instance, two or more playback devices may be configured into a synchrony group (e.g., a zone group, stereo pair, or surround sound configuration). A particular audio content may be designated for playback by this synchrony group.

Within examples, processing system 500 may store at least a portion of the received audio content in memory. For instance, processing system 500 may buffer received audio content in a first-in-first-out buffer (e.g., a circular buffer). In such implementations, portions of the received audio are stored in the buffer when they are received, and are removed as they are processed to which enables the playback device to determine if the received audio content contains wake words.

b. Detect, in the Audio Content, One or More Wake Words

In FIG. 11, at block 1104, implementation 1100 involves detecting, in the audio content, one or more wake-words before the audio content is played back by the playback device. For instance, the NMD may analyze the received data representing the audio content to determine if wake words for any voice services are represented in the audio content, such that when the audio content is played back, the wake words will be played audibly. As noted above, in some implementations, the NMD may include a processing system (e.g., processing system 500) and detect wake words within the audio content using a wake-word detection component (such as wake-word detection component 504 of FIG. 5).

The NMD may analyze the received audio content using one or more wake word detection algorithms. Example wake word detection algorithms accept an audio recording as input and provide an indication of whether a wake word is present in the recording as output. Many first- and third-party wake word detection algorithms are known and commercially available. For instance, operators of a voice service may make their algorithm available for use in third-party devices. Alternatively, an algorithm may be trained to detect certain wake-words.

In regular operation, a NMD will listen for sound (e.g., human voices) in a household or other environment via a microphone and run audio recordings of that sound through a wake word detection algorithm to detect if the sound contained a wake word. In this process, the NMD may use the same or similar algorithm as used by the NMD for detecting wake words spoken by human voices. However, instead of the input to the algorithm being audio recorded via a microphone, the input is audio content for playback by a playback device. In such a manner, the NMD may detect the same or similar wake words in the audio content as a NMD would detect if the audio content was played back in audible range of the NMDs. However, given that NMDs typically run wake word detection algorithms on microphone-recorded audio that was spoken by a wide variety of human voices in varying environmental conditions (e.g., possibly a noisy household), a wake word algorithm operating on received audio content without such variability may be even more effective in detecting wake words.

During analysis, the NMD may determine where each wake word occurs in the received audio content. After identifying the portions of the audio content that are determined to include a wake word, the NMD may note these portions of the audio content using one or more timestamps (e.g., a time stamp indicating a start time for the wake-word, and perhaps another timestamp indicating a stop time for that wake word). Ultimately, these time-stamps may be used to disable the wake-response of the NMDs to the wake-words corresponding to each time-stamp.

In one example, the NMD may divide the received audio content into segments of known length. Then, the NMD may identify the portion(s) of the audio content—i.e., the segments—that include a wake word by identifying the segment(s) in which the wake word(s) were detected. For example, if each segment is 4 seconds long and the wake word was detected in the sixth segment, the wake word is located between 20 and 24 seconds into the recording. In some instances, the NMD may separate the audio recording into overlapping segments, to avoid breaking apart a wake word into unrecognizable portions (e.g., one section representing "Hey" and another segment representing "Alexa"). Other techniques for determining the location of a wake word within the audio recording can be utilized as well.

In some instances, the NMD runs multiple wake word detections algorithms on the received audio content concurrently. As noted above, different voice services (e.g. AMAZON's ALEXA®, APPLE's SIRI®, or MICROSOFT's CORTANA®) may each use a different wake word for invoking their respective voice service. Further, each voice service may support multiple wake words and/or custom wake words. To an effort to support multiple voice services, the NMD may run the received audio content through the wake word detection algorithm for each supported voice service in parallel, so as to detect different wake words that might be represented in the audio content. For instance, the NMD may apply a first audio detection algorithm for a first voice service to detect at least one first wake word for the first voice service and apply a second audio detection algorithm for a second voice service to detect at least one second wake word for the second voice service. Before the audio content is played back by the playback device, the NMD may apply additional audio detection algorithms to the audio content as well, possibly for respective voice services.

c. Disable Wake Response to the Detected One or More Wake Words During Playback of the Audio Content In FIG. 11, at block 1106, implementation 1100 involves disabling a wake response to the detected one or more wake-words during playback of the audio content. For instance, the NMD may disable its wake response to the one or more wake-words that were detected in the audio content when the audio content is played back audibly by the playback device.

As noted above, the wake response of an NMD refers to its programmed response to detecting a wake word. When a wake response is enabled, in response to detecting a wake word, the wake response of an NMD causes the NMD to listen, via a microphone, for a voice command following the particular wake word. The NMD invokes a voice service to carry out the voice command. However, when the wake response is disabled, the NMD might not listen for the voice command and will not invoke the voice service to carry out the voice command.

In some implementations, the NMD disables its wake response by preventing the NMD from detecting the wake word as it is played back by the playback device. For instance, the NMD may stop listening for wake words (e.g., to stop processing recorded audio) for one or more period of times (i.e., the periods of time corresponding to when the wake words will be played back by the playback device, perhaps notated by time-stamps). Alternatively, the NMD may disable its microphone temporarily (e.g., during the period of times noted above). As yet another example, the NMD may create a listening NULL in the direction of the playback device using its microphone array, so that the NMD does not detect the wake word. Other examples are possible as well.

In further examples, the NMD detects the wake word as it is played back by the playback device, but suppresses its wake response to that detected wake word. For instance, the NMD may disregard wake words during periods of time or to disregard all audio during certain periods of time. Other examples are possible as well.

As another example, the NMD may count the number of wake words in the audio content (or in a portion of the audio content). For instance, the NMD might detect three wake words in an example audio content. As noted above, such instances may include any combination of wake words, including different wake words for different voice services. Then, the NMD may then disable its wake response until it detected a number of wake words equal to the count (e.g., by ignoring the next three wake words).

Alternatively, the NMD disable its respective wake response to the detected one or more wake words by modifying the audio content to incorporate acoustic markers in segments of the audio content. For instance, the NMD may insert (e.g., mix in) in an audio tone or other marker in the recorded audio content to designate wake words detected in the audio content. Then, given that the NMD is programmed to disable its wake response in response to detecting such an audio marker, the NMD will automatically suppress the wake response when detecting the wake words in the audio content played back by the playback device.

In some examples, the NMD may cause one or more additional networked microphone devices to disable their respective wake responses to the detected wake word(s) when the wake word(s) are played back by the playback device. For instance, referring to FIG. 1, NMD 132 may cause NMD 134 to disable its wake response. Moreover, any of the playback devices and/or control devices in the household may implement a NMD, and NMD 132 may also disable the wake response of any of these playback devices.

The NMD may disable a particular set of NMDs within a household. In some cases, the set of NMDs that have their wake responses disabled is based on a zone or zone group configuration of a media playback system. For instance, if the NMD is associated with a particular zone, (e.g., if NMD 132 is associated with the Kitchen zone), the NMD may cause the respective wake responses of any NMDs that are also associated with that same zone to be disabled. These NMDs can include various devices that implement NMDs (e.g., playback devices), as well as dedicated NMDs. Further, if the particular zone that the NMD is associated with is joined with one or more additional zones in a zone group, the NMD may cause the respective wake responses of any NMDs that are also associated with the one or more additional zone to be also disabled. As indicated above, an association may be created between a NMD and a zone of a media playback system, perhaps to facilitate co-operation in a specific room of a household (e.g., a Kitchen zone).

Alternatively, the particular additional NMDs that have their wake responses disabled is based on the audible range of the playback device(s) that are playing back the audio content that includes the wake words. Audible range may be determined using any suitable technique. In some implementations, audible range is established based on an association of the NMD with one or more zones, as indicated above. In other examples, audible range is established during a set-up procedure (e.g. a calibration procedure), as described above in section III. Audible range established by zone configurations and/or set-up procedures can be stored as one or more state variables and shared among devices within a network (e.g., a LAN established by router 130 in the household shown in FIG. 1). By having access to such information, the NMD can determine the set of NMDs that will be in audible range of the playback device(s) that will be playing back the audio content, and cause the respective wake responses of these set of NMDs to be disabled.

To illustrate, in one example, NMD 132 in FIG. 1 detects one or more wake-words in a given audio content designed for playback by playback device 114 in the Kitchen zone. Accordingly, NMD 132 disables its wake response to these wake words. Since playback device 114 is also an NMD, NMD 132 disables the wake response of playback device 114. Moreover, since the Kitchen zone is in a zone group with the Dining Room zone, NMD 132 also disables the wake response of playback device 112, which is also an NMD, so that when the audio content is played back in the Dining Room zone in synchrony with the Kitchen zone, the NMD of playback device 112 does not falsely trigger.

In another example, NMD 134 in FIG. 1 detects one or more wake-words in a given audio content designed for playback by playback devices 122 and 124 in the Master Bedroom zone. Accordingly, NMD 134 disables its wake response to these wake words. Since playback device 116 implements an NMD and has been pre-established to be in audible range of playback devices 122 and 124 at their current volume level, NMD 134 also disables the wake response of playback device 116. NMD 134 is aware that playback device 116 is in audible range of playback devices 122 and 124 at their current volume level from one or more state variables shared with NMD 134 via a LAN created by router 130. Such state variables indicate to NMD 134 that status of various aspects of media playback system 100, such as the current playback configuration of playback devices 122 and 124 (e.g., stereo pair), their current volume level, and which NMDs have been determined to be within audible range of these playback devices in this playback configuration and at this volume level.

The NMD may cause the one or more additional NMDs to disable their respective wake responses using any suitable technique. The NMD may implement a processing system 500 that includes a notification component (e.g., notification component 506 of FIG. 5), and use the notification component to cause a set of one or more NMDs to disable its respective wake response to the detected one or more wake-words during playback of the audio content by the playback device.

In some implementations, the NMD causes the one or more additional NMDs to disable their respective wake response to the detected one or more wake words by sending, via a network interface to the one or more NMDs, instructions that cause the one or more NMDs to disable their respective wake responses during playback of the received audio content. As noted above, various devices of a media playback system (e.g., control devices, playback devices, and NMDs) may be interconnected via a local area network (e.g., via a local area networked formed by wired or wireless network router 130 of FIG. 1) to permit exchange of instructions and other messaging between the devices within the household. These devices of a media playback system may each be programmed to respond to certain instructions from other devices in the system. Example messages and instructions are described above in connection with FIGS. 9 and 10A, 10B, 10C, and 10D.

Alternatively, the NMD causes the one or more NMDs to disable its respective wake response to the detected one or more wake words by modifying the audio content to incorporate acoustic markers in segments of the audio content. Using such a technique, NMDs in audible range of the playback device need not be pre-determined or estimated. Rather, since the acoustic marker(s) are played back with the audio content, NMDs that are in audible range to detect the audio content (and, as such, may be falsely triggered by this content) are also in range to detect the acoustic marker(s) and responsively disable their wake response. If multiple NMDs are in audible range of the NMD, each NMD that detects a wake word responsively disables its wake response to the wake word in response to detecting the associated acoustic marker.

In some implementations, such as those in which the NMD modifies the audio content, the NMD provides the audio content to the playback device. In such instances, the NMD may operate as an intermediary between the source of audio content and the playback device. Transmitting the audio content to the playback device may cause the playback device to play back the audio content, as the playback device may be configured to play back received audio content. The NMD may provide the audio content to the playback device via any suitable communication interface, such as a network interface. If multiple playback devices are configured to play back the audio content, the NMD may provide the audio content to all of the playback devices, or the NMD may transmit the audio content to a subset of the playback devices (e.g., a group coordinator) which then distributes the audio content to other playback devices in the group, perhaps along with timing information to schedule synchronous playback.

To illustrate, in one example, playback devices 112 and 124 are in a zone group (i.e., a Kitchen+Dining Room zone group) that is configured to play back audio content in synchrony. After detecting wake words in audio content designated for playback by the zone group, NMD 132 may modify the audio content to include acoustic markers to designate the wake words in the audio content. Playback device 132 may then provide the modified audio content to playback device 112 and/or 114, so as to facilitate synchronous playback of the modified audio content.

d. Detect the Played Back Audio Content

At block 1108, implementation 1100 involves detecting the played back audio content via a microphone. For instance, while the playback device(s) are playing back the audio content that includes the one or more detected wake words, the NMD may detect the played back audio content via a microphone. In a configuration in which the wake response of the NMD is enabled, detecting the portions of the played back audio content that include wake words would trigger the wake response of the NMD. However, since the NMD disabled the wake response for the one or more wake words in the audio content, the wake response is not triggered.

In some implementations, a playback device implements the NMD. In such examples, the playback device may play back the received audio content via one or more speakers. In some instances, the speakers are co-located with the NMD in the same housing. Alternatively, the playback device may provide amplified audio via speaker jacks to one or more separate passive speakers. As another example, the playback device may play back the audio content by providing line-level audio to an amplifier, which then in turn provides amplified audio via speaker jacks to one or more passive speakers.

In some instances, an NMD is configured into a synchronous playback configuration with one or more additional playback devices. In such instances, playing back the audio content involves playing back the audio content in synchrony with the one or more additional playback devices. In some playback configurations (e.g., stereo pair or surround), each playback device in the playback configuration plays back a portion of the audio content in synchrony with the other playback devices in the playback configuration.

As noted above, in some implementations, the NMD provides the audio content to one or more playback devices for playback. In some examples, the NMD provides the audio content to the one or more playback devices to facilitate synchronous playback of that audio content with the NMD. In such implementations, the NMD may operate as a group coordinator for the synchrony group including the NMD and the one or more additional playback devices. As group coordinator, the NMD may additionally provide timing information to the one or more additional playback devices to facilitate the synchrony group scheduling synchronous playback. The playback device provides the audio content and/or the timing information via a network interface.

V. Example Techniques for a Computing System to Disable a Wake-Response

Figure 12:
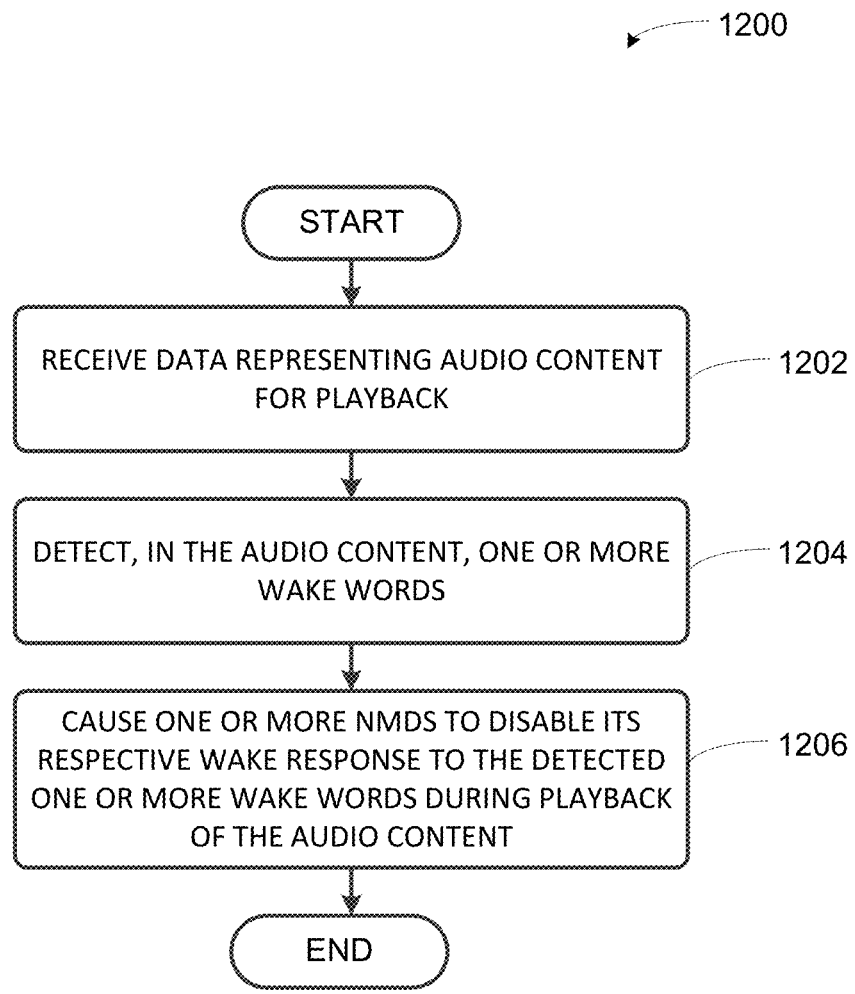
FIG. 12 shows an example flow diagram to disable a wake response of one or more NMDs.

As discussed above, embodiments described herein may involve disabling a wake response. FIG. 12 illustrates an example implementation 1200 by which a computing system disables a wake response of one or more NMDs to one or more wake words in audio content. In various embodiments, the computing system may be a cloud server. Alternatively, the computing system may be a local processing device (e.g., a device that is connected to the same LAN as a media playback system). The computing system may implement a playback device or a NMD.

a. Receive Data Representing Recorded Audio Content

At block 1202, implementation 1200 involves receiving data representing recorded audio content. For instance, a computing system may receive audio content for playback by a playback device. Example playback devices include any of playback devices 102, 104, 106, 108, 110, 112, 114, 116, 118, 120, 112, and 124 shown in FIG. 1, which may be implemented as represented by playback device 200 of FIG. 2, for instance. The processing system may include a processing system (e.g., processing system 500) and receive the data representing the audio content using an audio input/output component (such as audio input/output component 502 of FIG. 5). The computing system may receive the audio content using any suitable technique, such as the techniques discussed above in sections II, III and IV.

b. Detect, in the Audio Content, One or More Wake Words

In FIG. 12, at block 1204, implementation 1200 involves detecting, in the audio content, one or more wake-words before the audio content is played back by the playback device. For instance, the computing system may analyze the received data representing the audio content to determine if wake words for any voice services are represented in the audio content, such that when the audio content is played back, the wake words will be played audibly. As noted above, in some implementations, the computing system may include a processing system (e.g., processing system 500) and detect wake words within the audio content using a wake-word detection component (such as wake-word detection component 504 of FIG. 5). The computing system may detect the wake-words using any suitable technique, such as the techniques discussed above in sections II, III and IV.

c. Cause One or More NMDs to Disable its Respective Wake Response to the Detected One or More Wake Words During Playback of the Audio Content In FIG. 12, at block 1206, implementation 1200 involves causing one or more networked microphone devices to disable its respective wake response to the detected one or more wake-words during playback of the audio content. For instance, the computing system may cause NMDs that are in audible range of the playback device to disable their respective wake response to the detected one or more wake-words during playback of the audio content by the playback device. As noted above, the computing system may implement a processing system 500 that includes a notification component (e.g., notification component 506 of FIG. 5), and use the notification component to cause the one or more NMDs to disable its respective wake response to the detected one or more wake-words during playback of the audio content by the playback device. The computing system may cause the one or more NMDs to disable its respective wake response to the detected one or more wake-words during playback of the audio content using any suitable technique, such as the techniques discussed above in sections II, III and IV.

VI. Example Techniques to Suppress a Wake Response

Figure 13:
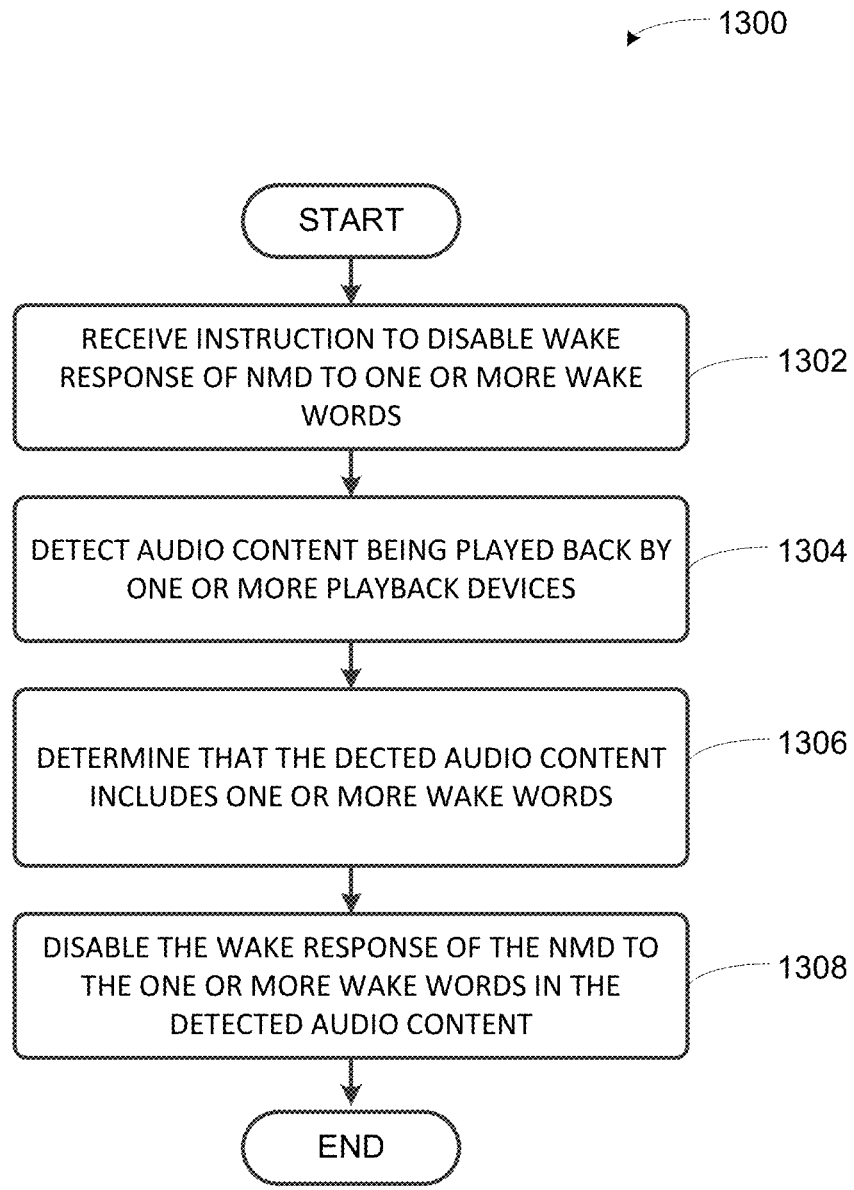
FIG. 13 shows an example flow diagram to suppress a wake response.

As discussed above, embodiments described herein may involve suppressing a wake response. FIG. 13 illustrates an example implementation 1300 by which a NMD disables a wake response.

a. Receive Instruction to Disable Wake Response of a NMD to One or More Wake Words At block 1302, implementation 1300 involves receiving an instruction to disable a wake response of an NMD to one or wake words. For instance, an NMD (e.g., NMD 132) may receive an instruction from another NMD, a playback device, a computing system, or any other device. The instruction causes the NMD to disable its wake response to one or more wake words that are represented in certain audio content that has been designated for playback by one or more playback devices.

In some implementations, the received instruction to disable the wake response of the NMD to one or wake words is implicit. For example, the NMD may be instructed to not detect the wake word as it is played back by the playback device, perhaps by instructing the NMD to stop listening for wake words, by disabling the microphone array of the NMD for a period of time, or by creating a listening NULL in the direction of the playback device, among other examples. Alternatively, the NMD may detect the wake word, but be instructed to suppress its programmed wake response to invoke a voice service in response to detecting the wake word, perhaps by disregarding wake words during certain periods of time or by disregarding all audio during certain periods of time. The NMD may be instructed using any suitable instruction, such as those discussed above in sections II, III and IV.

Alternatively, the received instruction is implicit. For instance, as described above, audio content may be modified to include acoustic markers designating wake words. In such implementations, the received instruction may be in the form of an acoustic marker. In some cases, the received instruction may be an instruction to disable the NMD's wake response when an acoustic marker is detected.

b. Detect Audio Content being Played Back by One or More Playback Devices

In FIG. 13, at block 1304, implementation 1300 involves detecting audio content being played back by one or more playback devices. For instance, the NMD may detect audio content being played back by a single playback device via a microphone. Alternatively, the NMD may detect audio content being played back by two or more devices (e.g., in synchrony).

c. Determine that the Detected Audio Content Includes One or More Wake Words

In FIG. 13, at block 1306, implementation 1300 involves determining that the detected audio content includes one or more wake words. For instance, the NMD may determine that the detected audio content includes one or more wake words by running the detected audio content through one or more wake word detection algorithms. In some instances, the NMD may run the detected audio content through multiple wake word detection algorithms (e.g., wake word detection algorithms for different wake words, possibly for different voice services). Example wake word detection algorithms are described throughout this disclosure.

d. Disable the Wake Response of the NMD to the One or More Wake Words in the Detected Audio Content In FIG. 13, at block 1308, implementation 1300 involves disabling the wake response of the NMD to the one or more wake words in the detected audio content. As noted above, the wake response of an NMD refers to its programmed response to detecting a wake word. When a wake response is enabled, in response to detecting a wake word, the wake response of an NMD causes the NMD to listen, via a microphone, for a voice command following the particular wake word. The NMD invokes a voice service to carry out the voice command. However, when the wake response is disabled, the NMD might not listen for the voice command and will not invoke the voice service to carry out the voice command.

VII. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

(Feature 1) A method comprising receiving, via a playback device, data representing audio content for playback by a playback device; before the audio content is played back by the playback device, detecting, in the audio content, one or more wake words for one or more voice services; causing one or more networked microphone devices to disable its respective wake response to the detected one or more wake words during playback of the audio content by the playback device, wherein, when enabled, the wake response of a given networked microphone device to a particular wake word causes the given networked microphone device to listen, via a microphone, for a voice command following the particular wake word; and playing back the audio content via one or more speakers.

(Feature 2) The method of feature 1, wherein the playback device comprises the given networked microphone device, and wherein causing the one or more networked microphone devices to disable their respective wake responses to the detected one or more wake words during playback of the audio content by the playback device comprises: while playing back the audio content, recording, via the microphone, the audio content being played back; and disabling respective wake responses of the given networked microphone device to the one or more wake words within the recorded audio content.

(Feature 3) The method of feature 1, wherein causing the one or more networked microphone devices to disable their respective wake responses to the detected one or more wake words during playback of the audio content by the playback device comprises: sending, via the network interface to the one or more networked microphone devices, instructions that cause the one or more networked microphone devices to disable their respective wake responses to the one or more wake words during playback of the audio content by the playback device.

(Feature 4) The method of feature 2, wherein the one or more networked microphones devices are a subset of networked microphone devices in a household, and wherein causing the one or more networked microphone devices to disable their respective wake responses to the detected one or more wake words during playback of the audio content by the playback device comprises: determining that the one or more networked microphone devices are in audible vicinity of the audio content; and in response to determining that the one or more networked microphones are in audible vicinity of the audio content, sending the instructions that cause the one or more networked microphone devices to disable their respective wake responses to the one or more wake words during playback of the audio content by the playback device.

(Feature 5) The method of feature 4, wherein the one or more networked microphone devices comprise respective playback devices, and wherein determining that the one or more networked microphones devices are in audible vicinity of the audio content comprises determining that the one or more networked microphone devices are in a synchronous playback configuration with the playback device.

(Feature 6) The method of feature 4, wherein determining that the one or more networked microphones devices are in audible vicinity of the audio content comprises determining that the one or more networked microphone devices are in audible vicinity of the playback device.

(Feature 7) The method of feature 1, wherein causing the one or more networked microphone devices to disable their respective wake responses to the detected one or more wake words during playback of the audio content by the playback device comprises: before playing back the audio content, modifying the audio content to incorporate acoustic markers in segments of the audio content that represent respective wake words, wherein detecting the acoustic markers causes the one or more networked microphone devices to disable their respective wake responses to the one or more wake words during playback of the audio content by the playback device.

(Feature 8) The method of feature 1, wherein detecting the one or more wake words comprises applying multiple wake-word detection algorithms to the audio content, wherein the multiple wake-word detection algorithms comprise a first wake-word detection algorithm for a first voice service and a second wake-word detection algorithm for a second voice service, and wherein applying multiple wake-word detection algorithms to the audio content before the audio content is played back by the playback device comprises: applying, to the audio content before the audio content is played back by the playback device, the first audio detection algorithm for the first voice service to detect at least one first wake word for the first voice service; and applying, to the audio content before the audio content is played back by the playback device, the second audio detection algorithm for the second voice service to detect at least one second wake word for the second voice service, wherein the second wake word is a different word than the first wake word, (Feature 9) The method of feature 1, wherein the one or more or more networked microphone devices comprise a first networked microphone device and a second networked microphone device, and wherein causing the one or more networked microphone devices to disable their respective wake responses to the detected one or more wake words during playback of the audio content by the playback device comprises: causing the first networked microphone device to disable its respective wake response to the detected at least one first wake word; and causing the second networked microphone device to disable its respective wake response to the detected at least one second wake word.

(Feature 10) The method of feature 1, wherein detecting, in the audio content, one or more wake words for one or more voice services comprises detecting multiple instances of a particular wake word in the audio content, and wherein causing the one or more networked microphone devices to disable their respective wake responses to the detected one or more wake words during playback of the audio content by the playback device comprises causing the one or more networked microphone devices to disable their respective wake responses until each networked microphone device has detected a number of wake words equal to a number of the multiple instances of the particular wake word detected in the audio content.

(Feature 11) A tangible, non-transitory computer-readable medium having stored therein instructions executable by one or more processors to cause a device to perform the method of any of features 1-10.

(Feature 12) A device configured to perform the method of any of features 1-10.

(Feature 13) A media playback system configured to perform the method of any of features 1-10.

(Feature 14) A method comprising: receiving, via a networked microphone device, data representing audio content for playback by a playback device; before the audio content is played back by the playback device, detecting, in the audio content, one or more wake words for one or more voice services; disabling a wake response of the networked microphone device to the detected one or more wake words during playback of the audio content by the playback device, wherein, when enabled, the wake response of the networked microphone device to a particular wake word causes the networked microphone device to listen, via a microphone, for a voice command following the particular wake word; and while the playback device is playing back the audio content, detecting the played back audio content via the microphone.

(Feature 15) The method of feature 14, further comprising transmitting, to the playback device via the network interface, the data representing the audio content to cause the playback device to play back the audio content.

(Feature 16) The method of feature 15, wherein disabling the wake response of the networked microphone device to the detected one or more wake words during playback of the audio content by the playback device comprises: before transmitting the data representing the audio content to the playback device, modifying the audio content to incorporate acoustic markers in segments of the audio content that represent respective wake words, wherein detecting the acoustic markers causes the networked microphone device to disable its respective wake responses to the one or more wake words during playback of the audio content by the playback device.

(Feature 17) The method of feature 14, further comprising causing one or more additional networked microphone devices to disable their respective wake responses to the detected one or more wake words during playback of the audio content by the playback device.

(Feature 18) The method of feature 17, wherein causing the one or more additional networked microphone devices to disable their respective wake responses to the detected one or more wake words during playback of the audio content by the playback device comprises: sending, via the network interface to the one or more additional networked microphone devices, instructions that cause the one or more networked microphone devices to disable their respective wake responses to the one or more wake words during playback of the audio content by the playback device.

(Feature 19) The method of feature 17, wherein the one or more additional networked microphones devices are a subset of networked microphone devices in a household, and wherein causing the one or more additional networked microphone devices to disable their respective wake responses to the detected one or more wake words during playback of the audio content by the playback device comprises: determining that the one or more networked microphones are in audible vicinity of the audio content; and in response to determining that the one or more networked microphones are in audible vicinity of the audio content, sending the instructions that cause the one or more networked microphone devices to disable their respective wake responses to the one or more wake words during playback of the audio content by the playback device.

(Feature 20) The method of feature 19, wherein the one or more networked microphone devices comprise respective playback devices, and wherein determining that the one or more networked microphones devices are in audible vicinity of the audio content comprises determining that that the one or more networked microphone devices are in a synchronous playback configuration with the playback device.

(Feature 21) The method of feature 14, wherein determining that the one or more networked microphones devices are in audible vicinity of the audio content comprises determining that the one or more networked microphone devices are in audible vicinity of the playback device.

(Feature 22) The method of feature 14, wherein detecting the one or more wake words comprises applying multiple wake-word detection algorithms to the audio content, wherein the multiple wake-word detection algorithms comprise a first wake-word detection algorithm for a first voice service and a second wake-word detection algorithm for a second voice service, and wherein applying multiple wake-word detection algorithms to the audio content before the audio content is played back by the playback device comprises: applying, to the audio content before the audio content is played back by the playback device, the first audio detection algorithm for the first voice service to detect at least one first wake word for the first voice service; and applying, to the audio content before the audio content is played back by the playback device, the second audio detection algorithm for the second voice service to detect at least one second wake word for the second voice service, wherein the second wake word is a different word than the first wake word.

(Feature 23) The method of feature 14, wherein the networked microphone device comprises the playback device, and wherein the method further comprises playing back the audio content via one or more speakers.

(Feature 24) A tangible, non-transitory computer-readable medium having stored therein instructions executable by one or more processors to cause a device to perform the method of any of features 14-23.

(Feature 25) A device configured to perform the method of any of features 14-23.

(Feature 26) A media playback system configured to perform the method of any of features 14-23.

(Feature 27) A method comprising: receiving, via a computing system, receiving, via an interface of the computing system, audio content for playback by one or more playback devices; before the audio content is played back by the playback device, detecting, in the audio content, one or more wake words for one or more voice services; and causing one or more networked microphone devices to disable their respective wake responses to the detected one or more wake words during playback of the audio content by the playback device, wherein, when enabled, the wake response of a given networked microphone device to a particular wake word causes the given networked microphone device to listen, via a microphone, for a voice command following the particular wake word.

(Feature 28) The method of feature 27, wherein causing the one or more networked microphone devices to disable their respective wake responses to the detected one or more wake words during playback of the audio content by the playback device comprises: sending, via the network interface to the one or more networked microphone devices, instructions that cause the one or more networked microphone devices to disable their respective wake responses to the one or more wake words during playback of the audio content by the playback device.

(Feature 29) The method of feature 28, wherein sending the instructions that cause the one or more networked microphone devices to disable their respective wake responses to the one or more wake words during playback of the audio content by the playback device comprises: sending instructions that cause the one or more networked microphone devices to disable their respective wake responses during one or more time periods corresponding to when the one or more playback devices will play back segments of the audio content that represent respective wake words.

(Feature 30) The method of feature 28, wherein sending the instructions that cause the one or more networked microphone devices to disable their respective wake responses to the one or more wake words during playback of the audio content by the playback device comprises: sending instructions that cause the one or more networked microphone devices to disable their respective microphones during one or more time periods corresponding to when the one or more playback devices will play back segments of the audio content that represent respective wake words.

(Feature 31) The method of feature 28, wherein the computing system detected a particular number of wake words in the audio content, and wherein sending the instructions that cause the one or more networked microphone devices to disable their respective wake responses to the one or more wake words during playback of the audio content by the playback device comprises: sending instructions that cause the one or more networked microphone devices to disable their respective wake responses until the one or more networked microphone devices have detected a number of wake words equal to the particular number of wake words detected in the audio content.

(Feature 32) The method of feature 28, wherein the one or more networked microphones devices are a subset of networked microphone devices in a household, and wherein causing the one or more networked microphone devices to disable their respective wake responses to the detected one or more wake words during playback of the audio content by the playback device comprises: determining that the one or more networked microphone devices are in audible vicinity of the audio content; and in response to determining that the one or more networked microphones are in audible vicinity of the audio content, sending the instructions that cause the one or more networked microphone devices to disable their respective wake responses to the one or more wake words during playback of the audio content by the playback device.

(Feature 33) The method of feature 32, wherein the one or more networked microphone devices comprise respective playback devices, and wherein determining that the one or more networked microphones devices are in audible vicinity of the audio content comprises determining that the one or more networked microphone devices are in a synchronous playback configuration with the playback device.

(Feature 34) The method of feature 32, wherein determining that the one or more networked microphones devices are in audible vicinity of the audio content comprises determining that the one or more networked microphone devices are in audible vicinity of the playback device.

(Feature 35) The method of feature 27, wherein causing the one or more networked microphone devices to disable their respective wake responses to the detected one or more wake words during playback of the audio content by the playback device comprises: before the one or more playback devices play back the audio content, modifying the audio content to incorporate acoustic markers in segments of the audio content that represent respective wake words, wherein detecting the acoustic markers causes the one or more networked microphone devices to disable their respective wake responses to the one or more wake words during playback of the audio content by the playback device; and transmitting the modified audio content to at least one of the one or more playback devices for playback by the one or more playback devices.

(Feature 36) The method of feature 35, wherein receiving the audio content for playback by one or more playback devices comprises one of: (a) receiving, via a network interface of the interface, data representing the audio content or (b) receiving, via an analog interface of the interface, an analog signal representing the audio content.

(Feature 37) The method of feature 27, wherein the computing system comprises a particular playback device of the one or more playback devices, and wherein the operations further comprise playing back the audio content.

(Feature 38) The method of feature 27, wherein the computing system comprises a particular networked microphone device of the one or more networked microphone device, and wherein the operations further comprise detecting, via a microphone, the audio content being playback back by the one or more playback devices.

(Feature 39) A tangible, non-transitory computer-readable medium having stored therein instructions executable by one or more processors to cause a device to perform the method of any of features 27-38.

(Feature 40) A device configured to perform the method of any of features 27-38.

(Feature 41) A media playback system configured to perform the method of any of features 27-38.

(Feature 42) A method comprising: receiving, via a networked microphone device, an instruction to disable a wake response of the networked microphone device to one or more wake words, wherein, when enabled, the wake response of the networked microphone device to a given wake word causes the networked microphone device to listen, via the microphone, for a voice command following the given wake word; detecting, via the microphone, audio content being played back by one or more playback devices; determining that the detected audio content includes one or more wake words; and in response to the received instruction, disabling the wake response of the networked microphone device to the one or more wake words in the detected audio content.

(Feature 43) The method of feature 42, wherein receiving the instruction to disable the wake response of the networked microphone device to the one or more wake words comprises: receiving an instruction to disable the wake response during one or more time periods corresponding to when the one or more playback devices will play back segments of the audio content corresponding to respective detected wake words.

(Feature 44) The method of feature 42, wherein receiving the instruction to disable the wake response of the networked microphone device to the one or more wake words comprises: receiving an instruction to disable the microphone during one or more time periods corresponding to when the one or more playback devices will play back segments of the audio content corresponding to respective detected wake words.

(Feature 45) The method of feature 42, wherein receiving the instruction to disable the wake response of the networked microphone device to the one or more wake words comprises: receiving an instruction to disable the wake response when consecutive wake words are detected until the networked microphone device has detected a number of wake words equal to a particular number of wake words.

(Feature 46) The method of feature 42, wherein receiving the instruction to disable the wake response of the networked microphone device to the one or more wake words comprises receiving an instruction to disable the wake response when an acoustic marker is detected, and wherein disabling the wake response of the networked microphone device to the one or more wake words in the detected audio content comprises: detecting acoustic markers in the detected audio content corresponding to respective detected wake words; and disabling the wake response in response to detecting each acoustic marker.

(Feature 47) The method of feature 42, wherein determining that the detected audio content includes one or more wake words comprises applying one or more wake-word detection algorithms to the detected audio content.

(Feature 48) A tangible, non-transitory computer-readable medium having stored therein instructions executable by one or more processors to cause a device to perform the method of any of features 42-47.

(Feature 49) A device configured to perform the method of any of features 42-47.

(Feature 50) A media playback system configured to perform the method of any of features 42-47.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A playback device comprising:
a network interface;
one or more processors;
tangible, non-transitory, computer-readable media having stored therein instructions executable by the one or more processors to cause the playback device to perform operations comprising:
receiving, via the network interface, data representing audio content for playback by the playback device;
before the audio content is played back by the playback device, detecting, in the audio content, one or more wake words for one or more voice services;
causing one or more networked microphone devices to disable its respective wake response to the detected one or more wake words during playback of the audio content by the playback device, wherein, when enabled, the wake response of a given networked microphone device to a particular wake word causes the given networked microphone device to listen, via a microphone, for a voice command following the particular wake word, wherein the one or more networked microphones devices are a subset of networked microphone devices in a household, and wherein causing the one or more networked microphone devices to disable their respective wake responses to the detected one or more wake words during playback of the audio content by the playback device comprises:
determining that the one or more networked microphone devices are in audible vicinity of the audio content; and
in response to determining that the one or more networked microphones are in audible vicinity of the audio content, sending, via the network interface to the one or more networked microphone devices, instructions that cause the one or more networked microphone devices to disable their respective wake responses to the one or more wake words during playback of the audio content by the playback device; and
playing back the audio content via one or more speakers.

2. The playback device of claim 1, wherein the playback device comprises the given networked microphone device, and wherein causing the one or more networked microphone devices to disable their respective wake responses to the detected one or more wake words during playback of the audio content by the playback device comprises:
while playing back the audio content, recording, via the microphone, the audio content being played back; and
disabling respective wake responses of the given networked microphone device to the one or more wake words within the recorded audio content.

3. The playback device of claim 1, wherein the one or more networked microphone devices comprise respective playback devices, and wherein determining that the one or more networked microphones devices are in audible vicinity of the audio content comprises determining that the one or more networked microphone devices are in a synchronous playback configuration with the playback device.

4. The playback device of claim 1, wherein determining that the one or more networked microphones devices are in audible vicinity of the audio content comprises determining that the one or more networked microphone devices are in audible vicinity of the playback device.

5. The playback device of claim 1, wherein causing the one or more networked microphone devices to disable their respective wake responses to the detected one or more wake words during playback of the audio content by the playback device comprises:

before playing back the audio content, modifying the audio content to incorporate acoustic markers in segments of the audio content that represent respective wake words, wherein detecting the acoustic markers causes the one or more networked microphone devices to disable their respective wake responses to the one or more wake words during playback of the audio content by the playback device.

6. The playback device of claim 1, wherein detecting the one or more wake words comprises applying multiple wake-word detection algorithms to the audio content, wherein the multiple wake-word detection algorithms comprise a first wake-word detection algorithm for a first voice service and a second wake-word detection algorithm for a second voice service, and wherein applying multiple wake-word detection algorithms to the audio content before the audio content is played back by the playback device comprises:

applying, to the audio content before the audio content is played back by the playback device, the first wake-word detection algorithm for the first voice service to detect at least one first wake word for the first voice service; and applying, to the audio content before the audio content is played back by the playback device, the second wake-word detection algorithm for the second voice service to detect at least one second wake word for the second voice service, wherein the second wake word is a different word than the first wake word.

7. The playback device of claim 6, wherein the one or more networked microphone devices comprise a first networked microphone device and a second networked microphone device, and wherein causing the one or more networked microphone devices to disable their respective wake responses to the detected one or more wake words during playback of the audio content by the playback device comprises:

causing the first networked microphone device to disable its respective wake response to the detected at least one first wake word; and causing the second networked microphone device to disable its respective wake response to the detected at least one second wake word.

8. The playback device of claim 1, wherein detecting, in the audio content, one or more wake words for one or more voice services comprises detecting multiple instances of a particular wake word in the audio content, and wherein causing the one or more networked microphone devices to disable their respective wake responses to the detected one or more wake words during playback of the audio content by the playback device comprises causing the one or more networked microphone devices to disable their respective wake responses until each networked microphone device has detected a number of wake words equal to a number of the multiple instances of the particular wake word detected in the audio content.

9. A tangible, non-transitory, computer-readable media having stored therein instructions executable by one or more processors to cause a playback device to perform operations comprising:

receiving, via a network interface, data representing audio content for playback by the playback device;

before the audio content is played back by the playback device, detecting, in the audio content, one or more wake words for one or more voice services;

causing one or more networked microphone devices to disable its respective wake response to the detected one or more wake words during playback of the audio content by the playback device, wherein, when enabled, the wake response of a given networked microphone device to a particular wake word causes the given networked microphone device to listen, via a microphone, for a voice command following the particular wake word, wherein the one or more networked microphones devices are a subset of networked microphone devices in a household, and wherein causing the one or more networked microphone devices to disable their respective wake responses to the detected one or more wake words during playback of the audio content by the playback device comprises:

determining that the one or more networked microphone devices are in audible vicinity of the audio content and in response to determining that the one or more networked microphones are in audible vicinity of the audio content, sending, via the network interface to the one or more networked microphone devices, instructions that cause the one or more networked microphone devices to disable their respective wake responses to the one or more wake words during playback of the audio content by the playback device; and playing back the audio content via one or more speakers.

10. The tangible, non-transitory, computer-readable media of claim 9, wherein the playback device comprises the given networked microphone device, and wherein causing the one or more networked microphone devices to disable their respective wake responses to the detected one or more wake words during playback of the audio content by the playback device comprises:

while playing back the audio content, recording, via the microphone, the audio content being played back; and disabling respective wake responses of the given networked microphone device to the one or more wake words within the recorded audio content.

11. The tangible, non-transitory, computer-readable media of claim 9, wherein causing the one or more networked microphone devices to disable their respective wake responses to the detected one or more wake words during playback of the audio content by the playback device comprises:

before playing back the audio content, modifying the audio content to incorporate acoustic markers in segments of the audio content that represent respective wake words, wherein detecting the acoustic markers causes the one or more networked microphone devices to disable their respective wake responses to the one or more wake words during playback of the audio content by the playback device.

12. The tangible, non-transitory, computer-readable media of claim 9, wherein detecting the one or more wake words comprises applying multiple wake-word detection algorithms to the audio content, wherein the multiple wake-word detection algorithms comprise a first wake-word detection algorithm for a first voice service and a second wake-word detection algorithm for a second voice service, and wherein applying multiple wake-word detection algorithms to the audio content before the audio content is played back by the playback device comprises:

applying, to the audio content before the audio content is played back by the playback device, the first wake-word detection algorithm for the first voice service to detect at least one first wake word for the first voice service; and applying, to the audio content before the audio content is played back by the playback device, the second wake-word detection algorithm for the second voice service to detect at least one second wake word for the second voice service, wherein the second wake word is a different word than the first wake word.

13. The tangible, non-transitory computer-readable medium of claim 9, wherein the one or more networked microphone devices comprise respective playback devices, and wherein determining that the one or more networked microphones devices are in audible vicinity of the audio content comprises determining that the one or more networked microphone devices are in a synchronous playback configuration with the playback device.

14. The tangible, non-transitory computer-readable medium of claim 9, wherein determining that the one or more networked microphones devices are in audible vicinity of the audio content comprises determining that the one or more networked microphone devices are in audible vicinity of the playback device.

15. A method comprising
receiving, via a network interface of a playback device, data representing audio content for playback by the playback device;
before the audio content is played back by the playback device, detecting, by the playback device in the audio content, one or more wake words for one or more voice services;
causing, by the playback device, one or more networked microphone devices to disable its respective wake response to the detected one or more wake words during playback of the audio content by the playback device, wherein, when enabled, the wake response of a given networked microphone device to a particular wake word causes the given networked microphone device to listen, via a microphone, for a voice command following the particular wake word, wherein the one or more networked microphones devices are a subset of networked microphone devices in a household, and wherein causing the one or more networked microphone devices to disable their respective wake responses to the detected one or more wake words during playback of the audio content by the playback device comprises:
determining that the one or more networked microphone devices are in audible vicinity of the audio content and
in response to determining that the one or more networked microphones are in audible vicinity of the audio content, sending, via the network interface to the one or more networked microphone devices, instructions that cause the one or more networked microphone devices to disable their respective wake responses to the one or more wake words during playback of the audio content by the playback device; and playing back, by the playback device, the audio content via one or more speakers.

16. The method of claim 15, wherein the playback device comprises the given networked microphone device, and wherein causing the one or more networked microphone devices to disable their respective wake responses to the detected one or more wake words during playback of the audio content by the playback device comprises:
while playing back the audio content, recording, via the microphone, the audio content being played back; and
disabling respective wake responses of the given networked microphone device to the one or more wake words within the recorded audio content.

17. The method of claim 15, wherein causing the one or more networked microphone devices to disable their respective wake responses to the detected one or more wake words during playback of the audio content by the playback device comprises:
before playing back the audio content, modifying the audio content to incorporate acoustic markers in segments of the audio content that represent respective wake words, wherein detecting the acoustic markers causes the one or more networked microphone devices to disable their respective wake responses to the one or more wake words during playback of the audio content by the playback device.

18. The method of claim 15, wherein detecting the one or more wake words comprises applying multiple wake-word detection algorithms to the audio content, wherein the multiple wake-word detection algorithms comprise a first wake-word detection algorithm for a first voice service and a second wake-word detection algorithm for a second voice service, and wherein applying multiple wake-word detection algorithms to the audio content before the audio content is played back by the playback device comprises:
applying, to the audio content before the audio content is played back by the playback device, the first wake-word detection algorithm for the first voice service to detect at least one first wake word for the first voice service; and
applying, to the audio content before the audio content is played back by the playback device, the second wake-word detection algorithm for the second voice service to detect at least one second wake word for the second voice service, wherein the second wake word is a different word than the first wake word.

19. The method of claim 15, wherein the one or more networked microphone devices comprise respective playback devices, and wherein determining that the one or more networked microphones devices are in audible vicinity of the audio content comprises determining that the one or more networked microphone devices are in a synchronous playback configuration with the playback device.

20. The method of claim 15, wherein determining that the one or more networked microphones devices are in audible vicinity of the audio content comprises determining that the one or more networked microphone devices are in audible vicinity of the playback device.

* * * * *